US011962092B2

(12) United States Patent
Jia

(10) Patent No.: US 11,962,092 B2
(45) Date of Patent: Apr. 16, 2024

(54) ANTENNA MODULE AND ELECTRONIC DEVICE

(71) Applicant: GUANGDONG OPPO MOBILE TELECOMMUNICATIONS CORP., LTD., Guangdong (CN)

(72) Inventor: Yuhu Jia, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 268 days.

(21) Appl. No.: 17/675,599

(22) Filed: Feb. 18, 2022

(65) Prior Publication Data

US 2022/0173528 A1 Jun. 2, 2022

Related U.S. Application Data

(63) Continuation of application No. PCT/CN2020/118790, filed on Sep. 29, 2020.

(30) Foreign Application Priority Data

Oct. 31, 2019 (CN) ........................ 201911052776.7

(51) Int. Cl.
*H01Q 21/06* (2006.01)
*H01Q 9/04* (2006.01)
*H01Q 21/00* (2006.01)

(52) U.S. Cl.
CPC ......... *H01Q 21/065* (2013.01); *H01Q 9/0421* (2013.01); *H01Q 21/0075* (2013.01)

(58) Field of Classification Search
CPC ........ H01Q 1/38; H01Q 9/0407; H01Q 1/246; H01Q 1/44; H01Q 21/28; H01Q 1/243;
(Continued)

(56) References Cited

U.S. PATENT DOCUMENTS

2013/0176030 A1 7/2013 Simon
2019/0165476 A1 5/2019 Hong et al.

FOREIGN PATENT DOCUMENTS

CN 102931479 A 2/2013
CN 103367897 A 10/2013
(Continued)

OTHER PUBLICATIONS

Yujian Li et al,"A Ka-Band LTCC Magneto-Electric Dipole Array for 5G Communications", 2018 Asia-Pacific Microwave Conference (APMC), IEICE, XP033500318, Nov. 6, 2018. (1576-1578 pages).

(Continued)

*Primary Examiner* — Monica C King
(74) *Attorney, Agent, or Firm* — Young Basile Hanlon & MacFarlane, P.C.

(57) ABSTRACT

An antenna module and an electronic device are provided. The antenna module includes a dielectric substrate, a patch array, a feed ground layer, a feed ground portion, and a feeding portion. The feed ground portion is electrically connected between the patch array and the feed ground layer. The feed ground portion has a first part, a second part, a third part, a fourth part, and the fifth part. The first part is electrically connected with the patch array, and the third part and the fifth part are electrically connected with the feed ground layer. The feeding portion is configured to feed a current signal, where the current signal is coupled to the patch array to excite the patch array to resonate in a first frequency band, and the current signal is coupled to the feed ground portion to excite the feed ground portion to resonate in a second frequency band.

20 Claims, 14 Drawing Sheets

(58) Field of Classification Search
CPC ...... H01Q 3/46; H01Q 21/065; H01Q 1/1271; H01Q 9/0414; H01Q 9/40; H01Q 1/04; H01Q 1/36; H01Q 1/2291; H01Q 1/48; H01Q 3/20; H01Q 19/09; H01Q 3/44; H01Q 1/12; H01Q 21/0025; H01Q 1/2283; H01Q 1/22; H01Q 1/523; H01Q 13/08; H01Q 1/24; H01Q 1/3291; H01Q 5/25; H01Q 21/08; H01Q 1/273; H01Q 21/24; H01Q 9/42; H01Q 23/00; H01Q 3/36; H01Q 9/0464; H01Q 5/10; H01Q 9/045; H01Q 9/285; H01Q 1/002; H01Q 15/0093; H01Q 21/245; H01Q 3/2629; H01Q 9/26; H01Q 9/28; H01Q 21/0031; H01Q 1/125; H01Q 1/241; H01Q 1/248; H01Q 1/42; H01Q 1/50; H01Q 21/062; H01Q 1/007; H01Q 1/3275; H01Q 1/3283; H01Q 1/422; H01Q 13/02; H01Q 21/061; H01Q 3/24; H01Q 9/04; H01Q 1/2208; H01Q 1/32; H01Q 11/04; H01Q 15/0013; H01Q 15/006; H01Q 5/35; H01Q 5/364; H01Q 9/0421; H01Q 9/16; H01Q 1/325; H01Q 1/526; H01Q 21/29; H01Q 25/001; H01Q 5/47; H01Q 1/2225; H01Q 1/27; H01Q 21/26; H01Q 5/378; H01Q 9/0442; H01Q 1/2216; H01Q 1/288; H01Q 21/064; H01Q 1/405; H01Q 21/0075; H01Q 25/005; H01Q 3/14; H01Q 3/2611; H01Q 3/2647; H01Q 7/00; H01Q 7/08; H01Q 1/02; H01Q 1/40; H01Q 1/46; H01Q 13/106; H01Q 21/0043; H01Q 21/0056; H01Q 21/0093; H01Q 21/06; H01Q 3/01; H01Q 5/314; H01Q 9/0457; H01Q 9/0485; H01Q 15/0053; H01Q 17/00; H01Q 21/20; H01Q 1/2241; H01Q 1/3233; H01Q 1/364; H01Q 13/18; H01Q 15/0086; H01Q 15/16; H01Q 19/005; H01Q 21/0087; H01Q 21/067; H01Q 21/205; H01Q 21/30; H01Q 25/007; H01Q 3/26; H01Q 3/40; H01Q 5/20; H01Q 5/30; H01Q 5/40; H01Q 9/06; H01Q 1/1221; H01Q 1/521; H01Q 19/062; H01Q 19/104; H01Q 19/17; H01Q 19/185; H01Q 3/2605; H01Q 3/267; H01Q 3/30; H01Q 3/34; H01Q 5/307; H01Q 9/30; H01Q 1/52; H01Q 13/0233; H01Q 15/08; H01Q 19/06; H01Q 19/08; H01Q 5/45; H01Q 5/48; H01Q 5/50; H01Q 9/0435; H01Q 1/1207; H01Q 1/3241; H01Q 13/10; H01Q 15/14; H01Q 19/10; H01Q 21/22; H01Q 3/247; H01Q 3/2617; H01Q 3/28; H01Q 5/357; H01Q 9/065; H01Q 9/36; H01Q 1/081; H01Q 1/2266; H01Q 1/28; H01Q 1/368; H01Q 13/0225; H01Q 13/06; H01Q 13/103; H01Q 13/24; H01Q 19/106; H01Q 19/108; H01Q 19/18; H01Q 19/19; H01Q 19/193; H01Q 21/00; H01Q 21/0068; H01Q 25/00; H01Q 3/18; H01Q 3/38; H01Q 5/335; H01Q 5/392; H01Q 9/38
See application file for complete search history.

(56) References Cited

FOREIGN PATENT DOCUMENTS

| | | | | |
|---|---|---|---|---|
| CN | 105071052 | A | | 11/2015 |
| CN | 105742793 | A | | 7/2016 |
| CN | 107230829 | A | | 10/2017 |
| CN | 107681262 | A | | 2/2018 |
| CN | 107749518 | A | | 3/2018 |
| CN | 108539395 | A | | 9/2018 |
| CN | 108832288 | A | | 11/2018 |
| CN | 109244656 | A | | 1/2019 |
| CN | 109301472 | A | | 2/2019 |
| CN | 109301473 | A | | 2/2019 |
| CN | 109361073 | A | | 2/2019 |
| CN | 110048211 | A | | 7/2019 |
| CN | 110048224 | A | | 7/2019 |
| CN | 110098477 | A | | 8/2019 |
| CN | 110190392 | A | | 8/2019 |
| CN | 211428346 | U | | 9/2020 |
| IN | 109301460 | A | | 2/2019 |
| JP | 2006033845 | A | | 2/2006 |
| WO | WO-2021021017 | A1 | * | 2/2021 |

OTHER PUBLICATIONS

Nie nian-sheng et al,"Design of a Magnetoelectric Dipole Antenna for Wideband Wide-Scanning Phased Array", 2019 IEEE MTT-S International Wireless Symposium (IWS), IEEE, May 19, 2019. (1-3 pages).

Li Xiuping et al,"A Low-Profile Substrate Integrated Magneto-Electric Dipole Antenna Based on Folded Magnetic Wall for UWB Application", 2018 IEEE/MTT-S International Microwave Symposium—IMS, IEEE, Jun. 10, 2018. (1545-1548 pages).

Zhai Huiqing et al,"An LTE Base-Station Magnetoelectric Dipole Antenna with Anti-Interference Characteristics and Its MIMO System Application", IEEE Antennas and Wireless Propagation Letters, vol. 14, Apr. 10, 2015. (906-909 pages).

Extended European Search Report for EP Application 20880818.8 dated Oct. 28, 2022. (14 pages).

ETSI TS 138 101-2 V15.3.0 (Oct. 2018); Technical Specification; 5G; NR; User Equipment (UE) radio transmission and reception; Part 2: Range 2 Standalone (3GPP TS 38.101-2 version 15.3.0 Release 15); pp. 1-108.

3GPP TR 38.803 V0.2.0 (Oct. 2016); 3rd Generation Partnership Project; Technical Specification Group Radio Access Network; Study on New Radio Access Technology; RF and co-existence aspects (Release 14).

China First Office Action with English Translation issued in corresponding CN application No. 201911052776.7 dated Aug. 18, 2021.

Guo, Li et al. A Low-Profile Dual-Polarized Patch Antenna with Bandwidth Enhanced by Stacked Parasitic Elements, dated May 11, 2018.

International search report with English Translation issued in corresponding PCT/CN2020/118790 dated Dec. 31, 2020.

Notice of allowance with English Translation issued in corresponding CN application No. 201911052776.7 dated Jan. 30, 2022.

* cited by examiner

ANTENNA MODULE AND ELECTRONIC DEVICE

CROSS-REFERENCE TO RELATED APPLICATION(S)

This application is a continuation application of International Application No. PCT/CN2020/118790, filed on Sep. 29, 2020, which claims priority to Chinese Patent Application No. 201911052776.7 filed on Oct. 31, 2019, the entire disclosure of both of which are incorporated herein by reference.

TECHNICAL FIELD

This disclosure relates to the technical field of electronics, and in particular to an antenna module and an electronic device.

BACKGROUND

Millimeter wave (mmWave) has characteristics of high carrier frequency and large bandwidth, and is a main means to realize ultra-high data transmission rate of the fifth generation (5G) mobile communication technology. Due to intense space losses of electromagnetic waves in a mmWave frequency band, a wireless communication system using the mmWave frequency band needs a framework using a phased array. A phase of each array element is distributed according to a certain rule through a phase shifter, so as to form a beam with a high gain, and the beam is scanned within a certain spatial range by changing phase shift. In order to meet requirements for bandwidths, an antenna layer part of a module needs a relatively thick dielectric layer, and since a high density interconnector (HDI) process needs to ensure symmetry of stacked layers, a total thickness of an antenna module is relatively large.

SUMMARY

An antenna module is provided in implementations of the present disclosure. The antenna module includes a dielectric substrate, a patch array, a feed ground layer, a feed ground portion, and a feeding portion. The patch array is carried on the dielectric substrate. The feed ground layer carries the dielectric substrate and is spaced apart from the patch array. The feed ground portion is electrically connected between the patch array and the feed ground layer. The feed ground portion has a first part, a second part, a third part, a fourth part, and a fifth part. The first part, the second part, and the third part are bendably connected in sequence, and the first part, the fourth part, and the fifth part are bendably connected in sequence. The first part is electrically connected with the patch array, the third part is electrically connected with the feed ground layer, and the fifth part is electrically connected with the feed ground layer. The feeding portion is configured to feed a current signal, the current signal is coupled to the patch array to excite the patch array to resonate in a first frequency band, and the current signal is coupled to the feed ground portion to excite the feed ground portion to resonate in a second frequency band.

An electronic device is further provided in implementations of the present disclosure. The electronic device includes a main board and the antenna module which is provided in any of the above implementations. The antenna module is electrically connected with the main board, and the antenna module is configured to receive and emit a RF signal of the first frequency band and the second frequency band under control of the main board.

BRIEF DESCRIPTION OF DRAWINGS

In order to describe technical solutions of implementations of the present disclosure more clearly, the following will give a brief introduction to the accompanying drawings used for describing the implementations. Apparently, the accompanying drawings hereinafter described are some implementations of the present disclosure. Based on these drawings, those of ordinary skill in the art can also obtain other drawings without creative effort.

DETAILED DESCRIPTION

Figure 1:
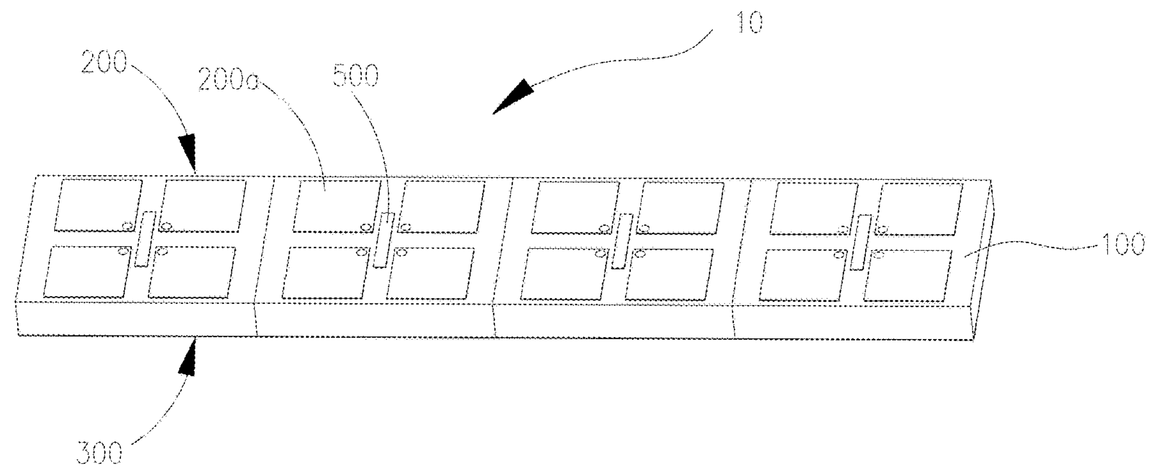
FIG. 1 is a schematic structural view illustrating an antenna module provided in implementations.

Technical solutions of implementations of the present disclosure will be described clearly and completely with reference to accompanying drawings in the implementations of the present disclosure. Apparently, the implementations described herein are merely some implementations, rather than all implementations, of the present disclosure. Based on the implementations of the present disclosure, all other implementations obtained by those of ordinary skill in the art without creative effort shall fall within the protection scope of the disclosure.

An antenna module is provided in implementations of the present disclosure. The antenna module includes a dielectric substrate, a patch array, a feed ground layer, a feed ground portion, and a feeding portion. The patch array is carried on the dielectric substrate. The feed ground layer carries the dielectric substrate and is spaced apart from the patch array. The feed ground portion is electrically connected between the patch array and the feed ground layer. The feed ground portion has a first part, a second part, a third part, a fourth part, and a fifth part. The first part, the second part, and the third part are bendably connected in sequence, the first part, the fourth part, and the fifth part are bendably connected in sequence, the first part is electrically connected with the patch array, the third part is electrically connected with the feed ground layer, and the fifth part is electrically connected with the feed ground layer. The feeding portion is configured to feed a current signal, the current signal is coupled to the patch array to excite the patch array to resonate in a first frequency band, and the current signal is coupled to the feed ground portion to excite the feed ground portion to resonate in a second frequency band.

In an implementation, the second part keeps orthogonal to the fourth part, the third part keeps parallel to the fifth part, and the second part keeps orthogonal or parallel to the feeding portion.

In an implementation, the first part is perpendicular to a plane on which the patch array is located, the third part is perpendicular to a plane on which the feed ground layer is located, and the fifth part is perpendicular to the plane on which the feed ground layer is located. A first preset included angle is defined between the first part and the second part, a second preset included angle is defined between the second part and the third part, a third preset included angle is defined between the first part and the fourth part, and a fourth preset included angle is defined between the fourth part and the fifth part, where the first preset included angle ranges from 80°~100°, the second preset included angle ranges from 80°~100°, the third preset included angle ranges from 80°~100°, and the fourth preset included angle ranges from 80°~100°.

In an implementation, each of the second part and the fourth part is a long-strip patch, a square patch, or a circular patch. The second part has a first electrical connection end and a second electrical connection end disposed opposite to the first electrical connection end, and the fourth part has a third electrical connection end and a fourth electrical connection end disposed opposite to the third electrical connection end. Each of the first electrical connection end and the third electrical connection end is electrically connected with the first part, the second electrical connection end is electrically connected with the third part, and the fourth electrical connection end is electrically connected with the fifth part.

In an implementation, the second part defines a first through hole, the fourth part defines a second through hole, the first through hole avoids the first electrical connection end and the second electrical connection end, and the second through hole avoids the third electrical connection end and the fourth electrical connection end.

In an implementation, the patch array includes a first radiator and a second radiator, the feed ground portion includes a first feed ground member and a second feed ground member, the first part, the second part, and the third part constitute the first feed ground member, the first part, the fourth part, and the fifth part constitute the second feed ground member, and both the first feed ground member and the second feed ground member are electrically connected with one of the first radiator and the second radiator.

In an implementation, each of the first radiator and the second radiator is a metal patch, and the first radiator and the second radiator are disposed in mirror symmetry.

In an implementation, the first radiator defines multiple first metallization via holes arranged in an array at an edge part of the first radiator close to the feeding portion, and the second radiator defines multiple second metallization via holes arranged in an array at an edge part of the second radiator close to the feeding portion.

In an implementation, the feed ground portion includes multiple feed ground members, and the feed ground member is in one-to-one correspondence with the first metallization via hole and the second metallization via hole, the feed ground member is electrically connected with the first metallization via hole to electrically connect the first radiator and the feed ground layer, and the feed ground member is electrically connected with the second metallization via hole to electrically connect the second radiator and the feed ground layer.

In an implementation, the first radiator defines a first accommodating groove at an edge part of the first radiator away from the feeding portion, the second radiator defines a second accommodating groove at an edge part of the second radiator away from the feeding portion, and an opening direction of the first accommodating groove is opposite to an opening direction of the second accommodating groove.

In an implementation, the first radiator defines a first curved groove at a middle part of the first radiator away from the feeding portion, and the second radiator defines a second curved groove at a middle part of the second radiator away from the feeding portion, and an opening direction of the first curved groove is opposite to an opening direction of the second curved groove.

In an implementation, the patch array constitutes an electric dipole antenna, the feed ground portion constitutes a magnetic dipole antenna, and a radiation direction of the patch array keeps orthogonal to a radiation direction of the feed ground portion.

In an implementation, the first frequency band is different from the second frequency band, a minimum value of the first frequency band is greater than a maximum value of the second frequency band, the first frequency band and the second frequency band together constitute a preset frequency band, and the preset frequency band at least includes a full frequency band of 3rd generation partnership project (3GPP) millimeter wave (mmWave).

In an implementation, a size of the feed ground layer is λ×λ, and a distance between the patch array and the feed ground layer is λ/4, where λ is a wavelength corresponding to an intermediate value of a center frequency of the first frequency band and a center frequency of the second frequency band.

In an implementation, the antenna module includes a feeding port. The feeding portion has a first section and a second section bendably connected with the first section, the first section is electrically connected with the feeding port, the first section is disposed close to the feed ground portion, and the second section is disposed close to the patch array.

In an implementation, the second section and the patch array are disposed side by side, and the second section and the patch array keep flush with each other.

In an implementation, the first section keeps perpendicular to the second section.

In an implementation, the antenna module includes a feeding port. The feeding portion has a first section, a second section, and a third section which are bendably connected, the second section is connected between the first section and the third section, the first section is electrically connected with the feeding port, the first section is disposed close to the feed ground portion, the second section is disposed close to the patch array, an extension direction of the third section keeps consistent with an extension direction of the first section, and the third section is configured to perform spatial impedance matching on a radio frequency (RF) signal received and emitted by the patch array.

In an implementation, a distance between the third section and the feed ground layer ranges from λ/8~λ/4, where λ is a wavelength corresponding to an intermediate value of a center frequency of the first frequency band and a center frequency of the second frequency band.

In an implementation, a projection of the patch array on the dielectric substrate is located within a range of a projection of the feed ground layer on the dielectric substrate.

In an implementation, an electronic device is further provided in implementations of the present disclosure. The electronic device includes a main board and the antenna module which is provided in any of the above implementations. The antenna module is electrically connected with the main board, and the antenna module is configured to receive and emit a RF signal of the first frequency band and the second frequency band under control of the main board.

In an implementation, the electronic device further includes a battery cover. The battery cover is spaced apart from the antenna module, the battery cover is at least partially located within a radiation direction range of receiving and emitting the RF signal by the antenna module, the antenna module is configured to receive and emit the RF signal through the battery cover under control of the main board, and the battery cover is made of any one or more of: plastic, glass, sapphire, and ceramic.

In an implementation, the main board is located at a side of the antenna module away from the battery cover, and the main board is configured to reflect the RF signal of the first frequency band and the second frequency band emitted by the antenna module toward a side where the battery cover is located.

In an implementation, the battery cover includes a back plate and a side plate surrounding the back plate, and the side plate is located within the radiation direction range of receiving and emitting the RF signal of the first frequency band and the second frequency band by the antenna module.

In an implementation, the battery cover includes a back plate and a side plate surrounding the back plate, and the back plate is located within the radiation direction range of receiving and emitting the RF signal of the first frequency band and the second frequency band by the antenna module.

In an implementation, the battery cover includes a back plate and a side plate surrounding the back plate, the antenna module includes a first module and a second module, the first module has a radiation surface facing the back plate, and the second module has a radiation surface facing the side plate.

In an implementation, the electronic device further includes a screen. The screen is spaced apart from the antenna module, and the screen is at least partially located within the radiation direction range of receiving and emitting the RF signal of the first frequency band and the second frequency band by the antenna module.

Figure 2:
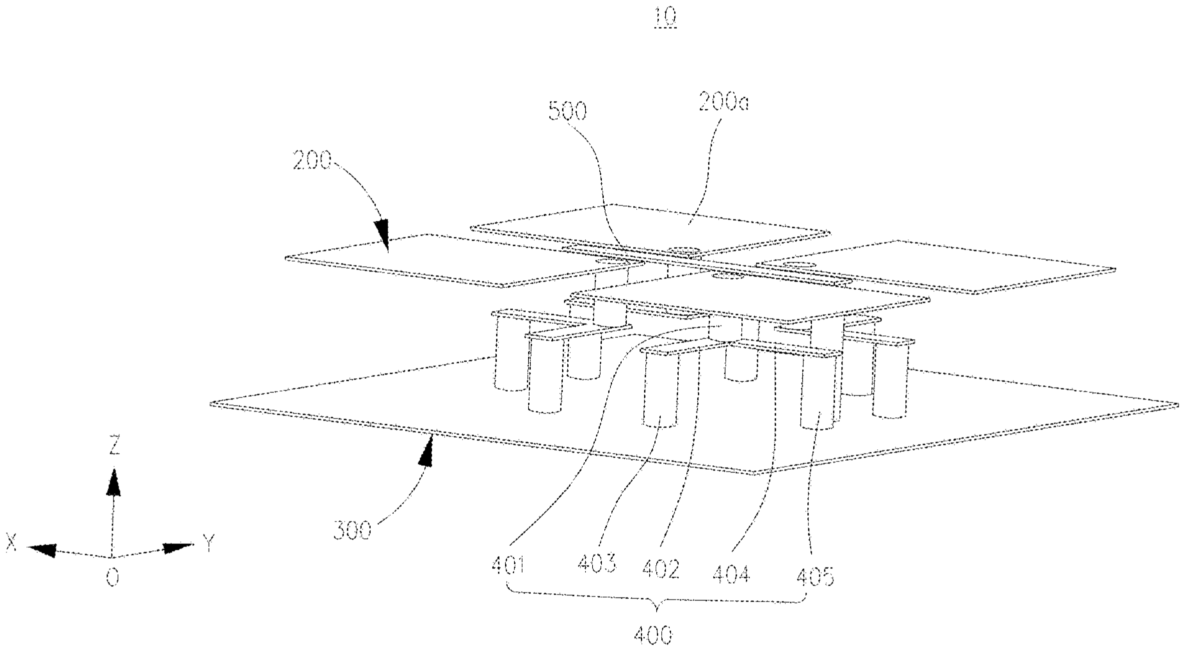
FIG. 2 is a partial schematic structural view illustrating the antenna module provided in FIG. 1.
Figure 3:
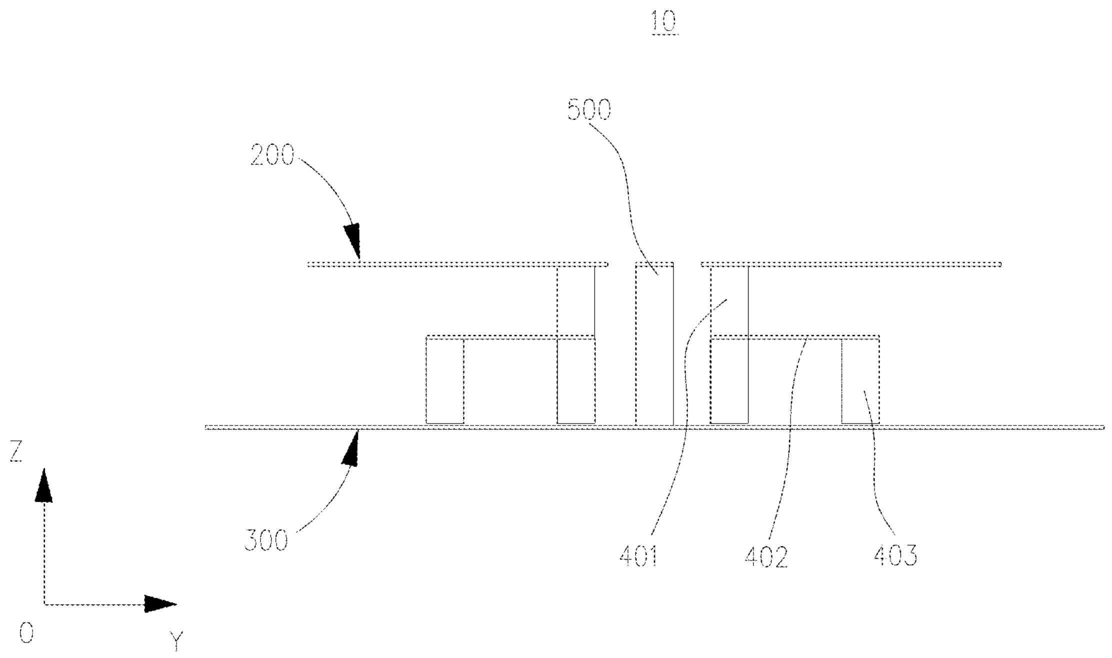
FIG. 3 is a schematic structural view illustrating the antenna module provided in FIG. 2, taken on YZ-plane.
Figure 4:
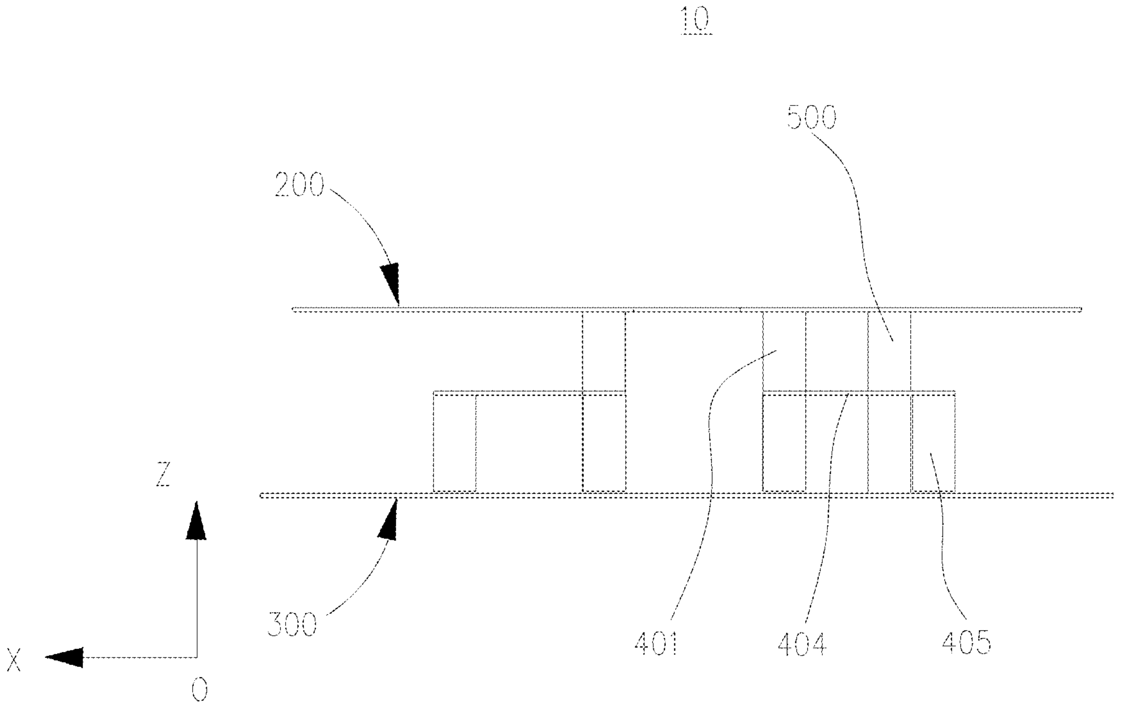
FIG. 4 is a schematic structural view illustrating the antenna module provided in FIG. 2, taken on XZ-plane.

Reference is made to FIG. 1, FIG. 2, FIG. 3, and FIG. 4, in order to observe an inner structure of an antenna module more clearly, an example of only one antenna module is taken for illustration in FIG. 2, FIG. 3, and FIG. 4, and a dielectric substrate 100 is omitted. An antenna module 10 provided in implementations of the present disclosure includes a dielectric substrate 100, a patch array 200, a feed ground layer 300, a feed ground portion 400, and a feeding portion 500. The patch array 200 is carried on the dielectric substrate 100. The feed ground layer 300 carries the dielectric substrate 100 and is spaced apart from the patch array 200. The feed ground portion 400 is electrically connected between the patch array 200 and the feed ground layer 300. The feed ground portion 400 has a first part 401, a second part 402, a third part 403, a fourth part 404, and a fifth part 405. The first part 401, the second part 402, and the third part 403 are bendably connected in sequence, the first part 401, the fourth part 404, and the fifth part 405 are bendably connected in sequence, the first part 401 is electrically connected with the patch array 200, the third part 403 is electrically connected with the feed ground layer 300, and the fifth part 405 is electrically connected with the feed ground layer 300. The feeding portion 500 is configured to feed a current signal, the current signal is coupled to the patch array 200 to excite the patch array 200 to resonate in a first frequency band, and the current signal is coupled to the feed ground portion 400 to excite the feed ground portion 400 to resonate in a second frequency band.

The first frequency band may be different from the second frequency band, such that receiving and emitting of a signal of a dual frequency band can be realized, which can make the antenna module 10 applicable to different situations. The first frequency band may be the same as the second frequency band, in this case, receiving and emitting of a signal of a single frequency band can be realized, which helps to enhance strength of the RF signal received and emitted by the antenna module 10.

The antenna module 10 may be a mmWave module. The antenna module 10 is configured to receive and emit a mmWave RF signal of a preset frequency band. The antenna module 10 may be formed by a high density interconnector (HDI) process or an integrated circuit (IC) substrate process. The dielectric substrate 100 is formed by pressing multiple layers of dielectric plates. The patch array 200, the feed ground layer 300, the feed ground portion 400, and the feeding portion 500 are all carried on the dielectric substrate 100. The feed ground layer 300 is spaced apart from the patch array 200. The feed ground portion 400 is connected between the feed ground layer 300 and the patch array 200. The feed ground portion 400 has a bending structure, which can extend a transmission path of a current, and in turn improve a bandwidth of the RF signal. Meanwhile, a thickness of the antenna module 10 can be reduced.

When the current signal is fed into the feeding portion 500, the current signal is coupled to the patch array 200, which can make the patch array 200 resonate in the first frequency band, in other words, which can make the patch array 200 generate a RF signal of the first frequency band. The current signal is coupled to the feed ground portion 400, which can make the feed ground portion 400 resonate in the second frequency band, in other words, which can make the feed ground portion 400 generate a RF signal of the second frequency band. When the first frequency band is different from the second frequency band, the RF signal of the first frequency band may be a high-frequency signal, and the RF signal of the second frequency band may be a low-frequency signal. Furthermore, a minimum value of the first frequency band is greater than a maximum value of the second frequency band, the first frequency band and the second frequency band together constitute the preset frequency band, and the preset frequency band at least includes a full frequency band of 3GPP mmWave.

According to the protocol of the 3GPP technical specification (TS) 38.101, two frequency bands are mainly used in the 5th generation (5G) mobile communication technology: a frequency range 1 (FR1) band and a frequency range 2 (FR2) band. The FR1 band has a frequency range of 450 megahertz (MHz)~6 gigahertz (GHz), and is also known as the sub-6 GHz frequency band; the FR2 band has a frequency range of 24.25 Ghz~52.6 GHz, and is generally known as the mmWave frequency band. The 3GPP Release 15 specifies that the present 5G mmWave frequency bands include: n257 (26.5~29.5 GHz), n258 (24.25~27.5 GHz), n261 (27.5~28.35 GHz), and n260 (37~40 GHz). When the first frequency band is different from the second frequency band, the first frequency band may be the mmWave frequency band, in this case, the second frequency band may be the sub-6 GHz frequency band. Each of the first frequency band and the second frequency band may also be the mmWave frequency band, where the first frequency band is a high-frequency mmWave frequency band, and the second frequency band is a low-frequency mmWave frequency band.

In an implementation, the patch array 200 constitutes an electric dipole antenna, the feed ground portion 400 constitutes a magnetic dipole antenna, and a radiation direction of the patch array 200 keeps orthogonal to a radiation direction of the feed ground portion 400.

The patch array 200 includes multiple patch units 200*a*, and each patch unit 200*a* constitutes an antenna radiator. The feeding portion 500 extends to a position close to the patch array 200, and the feeding portion 500 extends to a position close to the feed ground portion 400, which facilitates the current signal on the feeding portion 500 being coupled to the patch array 200 and the feed ground portion 400. Specifically, when the current signal on the feeding portion 500 is coupled to the patch array 200 and the feed ground portion 400 respectively, since a transmission direction of a coupled current signal on the patch array 200 keeps orthogonal to a transmission direction of a coupled current signal on the feed ground portion 400, a direction of radiating a RF signal by the patch array 200 can keep orthogonal to a direction of radiating a RF signal by the feed ground portion 400. The patch array 200 may constitute a 2×2 antenna array, a 2×4 antenna array, or a 4×4 antenna array. When the multiple antenna radiators constitute an antenna array, the multiple antenna radiators may operate in the same frequency band. The multiple antenna radiators may also operate in different frequency bands, which helps to broaden a range of frequency band of the antenna module 10.

In another implementation, a projection of the patch array 200 on the dielectric substrate 100 is located within a range of a projection of the feed ground layer 300 on the dielectric substrate 100. A size of the feed ground layer 300 is λ×λ, and a distance between the patch array 200 and the feed ground layer 300 is λ/4, where λ is a wavelength corresponding to an intermediate value of a center frequency of the first frequency band and a center frequency of the second frequency band.

Specifically, λ is a wavelength corresponding to a fixed frequency, and the fixed frequency is the intermediate value of the center frequency of the first frequency band and the center frequency of the second frequency band. When the size of feed ground layer 300 satisfies λ×λ and the distance between the patch array 200 and the feed ground layer 300 satisfies λ/4, the antenna module 10 can reach a relatively high radiation performance. In other words, an operating frequency of the antenna module 10 is closely related to a structural dimension of the antenna module 10, different structural dimensions of the antenna module 10 can affect the operating frequency of the antenna module 10, and can also affect the radiation performance of the antenna module 10.

In an implementation, the second part 402 keeps orthogonal to the fourth part 404, the third part 403 keeps parallel to the fifth part 405, the second part 402 keeps orthogonal or parallel to the feeding portion 500, which can make structural strength of the antenna module 10 more stable, and help to realize antenna polarization.

Figure 5:
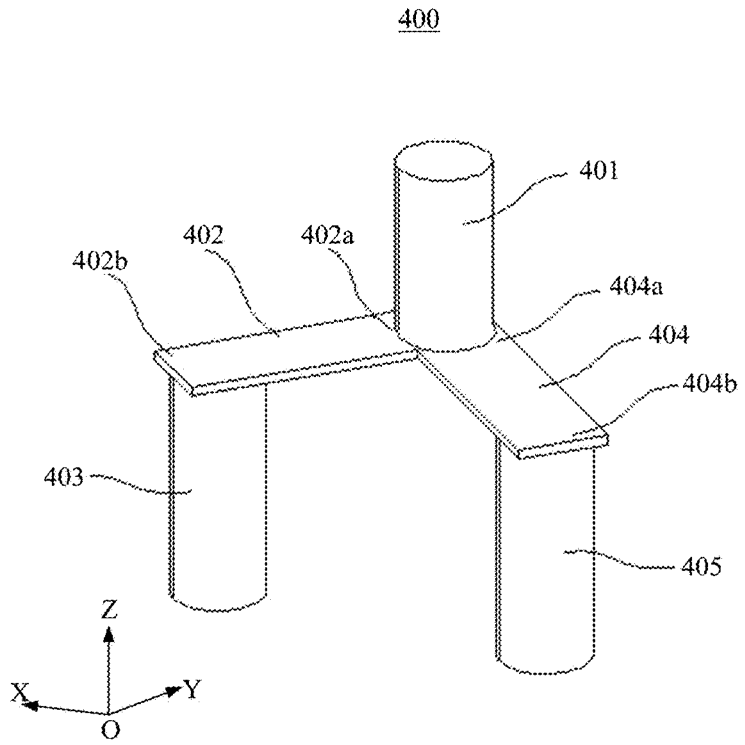
FIG. 5 is a schematic structural view illustrating a feed ground portion of an antenna module provided in implementations of the present disclosure.
Figure 6:
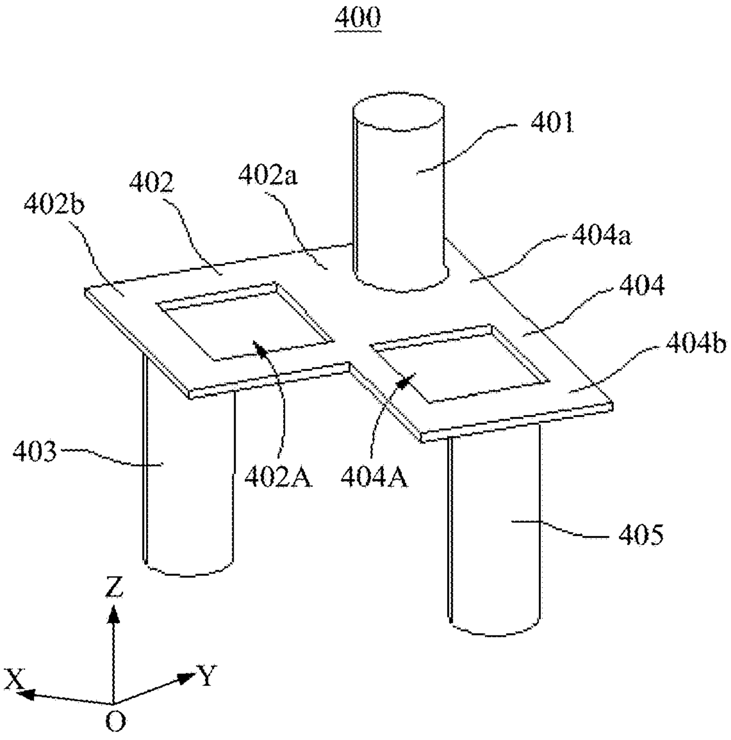
FIG. 6 is a schematic structural view illustrating a feed ground portion of an antenna module provided in other implementations of the present disclosure.
Figure 7:
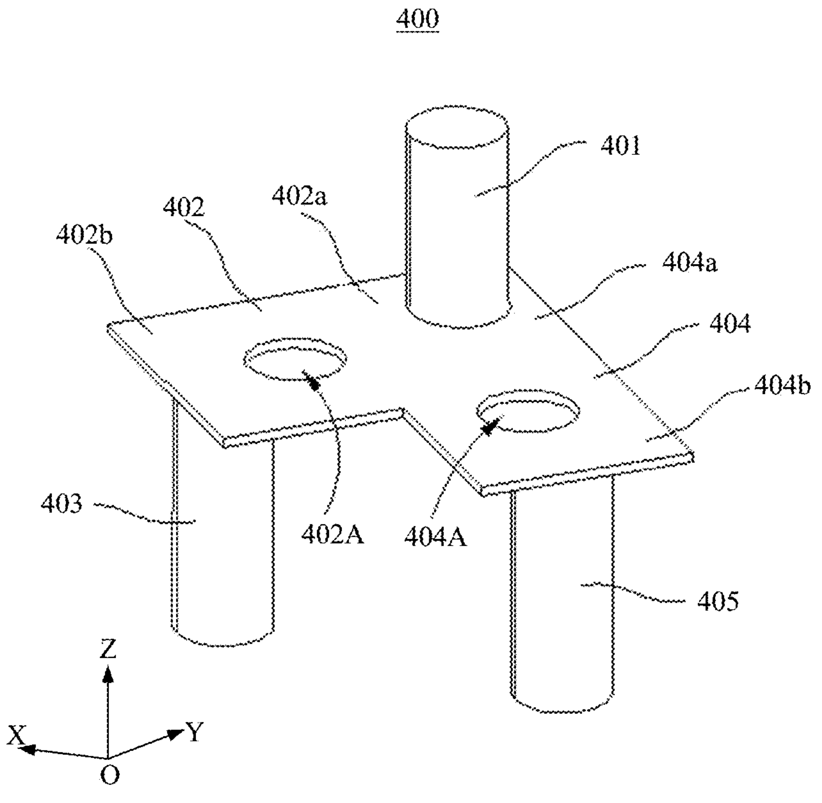
FIG. 7 is a schematic structural view illustrating a feed ground portion of an antenna module provided in other implementations of the present disclosure.

Reference can continue to be made to FIG. 5, FIG. 6, and FIG. 7. In another implementation, each of the second part 402 and the fourth part 404 is a long-strip patch. The second part 402 has a first electrical connection end 402*a* and a second electrical connection end 402*b* disposed opposite to the first electrical connection end 402*a*, and the fourth part 404 has a third electrical connection end 404*a* and a fourth electrical connection end 404*b* disposed opposite to the third electrical connection end 404*a*. Each of the first electrical connection end 402*a* and the third electrical connection end 404*a* is electrically connected with the first part 401, the second electrical connection end 402*b* is electrically connected with the third part 403, and the fourth electrical connection end 404*b* is electrically connected with the fifth part 405. The feed ground portion 400 forms a three-dimensional bending structure, which can reduce a thickness of the antenna module 10 and realize a low-profile characteristic. In addition, at least two loops can be formed between the patch array 200 and the feed ground layer 300, when one loop is disconnected, another loop can continue to feed a current, which helps to improve stability of the antenna module 10. In this case, an intensity of a coupled current per unit area can be enhanced to facilitate adjustment of a frequency band of a RF signal received and emitted by the feed ground portion 400, which makes the feed ground portion 400 resonate in the preset frequency band.

In another implementation, each of the second part 402 and the fourth part 404 is a square patch or a circular patch. The second part 402 has a first electrical connection end 402*a* and a second electrical connection end 402*b* spaced apart from the first electrical connection end 402*a*, and the fourth part 404 has a third electrical connection end 404*a* and a fourth electrical connection end 404*b* spaced apart from the third electrical connection end 404*a*. In addition, each of the first electrical connection end 402*a* and the third electrical connection end 404*a* is electrically connected with the first part 401, the second electrical connection end 402*b* is electrically connected with the third part 403, and the fourth electrical connection end 404*b* is electrically connected with the fifth part 405. In this case, the first electrical connection end 402*a* is overlapped with the third electrical connection end 404*a*, furthermore, each of a connection between the first electrical connection end 402*a* and the first part 401, a connection between the second electrical connection end 402*b* and the third part 403, and a connection between the fourth electrical connection end 404*b* and the fifth part 405 can be regarded as a point connection, which helps to improve sensitivity of feeding a current by the antenna module 10.

Furthermore, the second part 402 defines a first through hole 402A, the fourth part 404 defines a second through hole 404A, the first through hole 402A avoids the first electrical connection end 402*a* and the second electrical connection end 402*b*, and the second through hole 404A avoids the third electrical connection end 404*a* and the fourth electrical connection end 404*b*. Specifically, in this implementation, the first through hole 402A may be implemented as one first through hole 402A or multiple first through holes 402A, and the second through hole 404A may be implemented as one second through hole 404A or multiple second through holes 404A. When the current signal on the feeding portion 500 is coupled to the feed ground portion 400, coupled current in the feed ground portion 400 can be transmitted along multiple transmission paths, such that the transmission path of the coupled current can be extended, thereby improving the bandwidth of the RF signal received and emitted by the antenna module 10. The first electrical connection end 402*a* and the second electrical connection end 402*b* are disposed to avoid the first through hole 402A, the third electrical connection end 404*a* and the fourth electrical connection end 404*b* are disposed to avoid the second through hole 404A, which can keep an electrical connection relationship between the feed ground portion 400 and the patch array 200 and an electrical connection relationship between the feed ground portion 400 and the feed ground layer 300 stable.

In another implementation, the first part 401 is perpendicular to a plane on which the patch array 200 is located, the third part 403 is perpendicular to a plane on which the feed ground layer 300 is located, and the fifth part 405 is perpendicular to the plane on which the feed ground layer 300 is located. A first preset included angle is defined between the first part 401 and the second part 402, a second preset included angle is defined between the second part 402 and the third part 403, a third preset included angle is defined between the first part 401 and the fourth part 404, and a fourth preset included angle is defined between the fourth part 404 and the fifth part 405, where the first preset included angle ranges from 80°~100°, the second preset included angle ranges from 80°~100°, the third preset included angle ranges from 80°~100°, and the fourth preset included angle ranges from 80°~100°. As such, approximate vertical bending can be kept between various parts of the feed ground portion 400, which helps to improve the structural strength of the antenna module 10.

The first part 401, the second part 402, and the third part 403 are bent in a "ㄣ" shape, and the first part 401, the fourth part 404, and the fifth part 405 are bent in the "ㄣ" shape. An extension direction of the first part 401 keeps consistent with an extension direction of the third part 403. Specifically, the first part 401 is perpendicular to the plane on which the patch array 200 is located, the third part 403 is perpendicular to the plane on which the feed ground layer 300 is located, and the fifth part 405 is perpendicular to the plane on which the feed ground layer 300 is located. The first preset included angle ranges from 80°~100°, and the second preset included angle ranges from 80°~100°, where the first preset included angle may be equal or unequal to the second preset included angle. In an implementation, the first preset included angle is 90° and the second preset included angle is 90°. In this case, the patch array 200, the first part 401, the second part 402, the third part 403, and the feed ground layer 300 are kept perpendicular in sequence, such that the patch array 200, the first part 401, the second part 402, the third part 403, and the feed ground layer 300 can be relatively stably fixed to the dielectric substrate 100, which also helps to improve a yield rate when the antenna module 10 is prepared.

Furthermore, the second part 402 is a long-strip patch, and the second part 402 has a first electrical connection end 402*a* and a second electrical connection end 402*b* opposite to the first electrical connection end 402*a*. The first part 401 is electrically connected with the first electrical connection end 402*a*, and the third part 403 is electrically connected with the second electrical connection end 402*b*. The fourth part 404 is a long-strip patch, and the fourth part 404 has a third electrical connection end 404*a* and a fourth electrical connection end 404*b* opposite to the third electrical connection end 404*a*. The first part 401 is electrically connected with the third electrical connection end 404*a*, and the fifth part 405 is electrically connected with the fourth electrical connection end 404*b*. In this case, the feed ground portion 400 forms two loops between the patch array 200 and the feed ground layer 300, one loop is formed by the first part 401, the second part 402, and the third part 403, and another loop is formed by the first part 401, the fourth part 404 and the fifth part 405, which can make the patch array 200 and the feed ground layer 300 form a stable electrical connection relationship.

In the antenna module 10 provided in implementations of the present disclosure, the feed ground portion 400 electrically connected between the patch array 200 and the feed ground layer 300 is disposed as the three-dimensional bending structure, which can reduce the thickness of the antenna module 10 to 0.85 mm and can have the low-profile characteristic, while extending the transmission path of the current. In addition, the first part 401, the second part 402, and the third part 403 are bent in sequence, and the first part 401, the fourth part 404, and the fifth part 405 are bent in sequence. The first part 401 is electrically connected with the patch array 200, the third part 403 is electrically connected with the feed ground layer 300, the fifth part 405 is electrically connected with feed ground layer 300, and the at least two loops are formed between the patch array 200 and the feed ground layer 300, which helps to improve stability when the antenna module 10 operates. Furthermore, the feeding portion 500 performs coupled feeding on the antenna array and the feed ground portion 400, which can make the antenna module 10 operate in the same frequency band or different frequency bands, thereby helping to realize receiving and emitting of a RF signal of the single frequency band or the dual frequency band.

Figure 8:
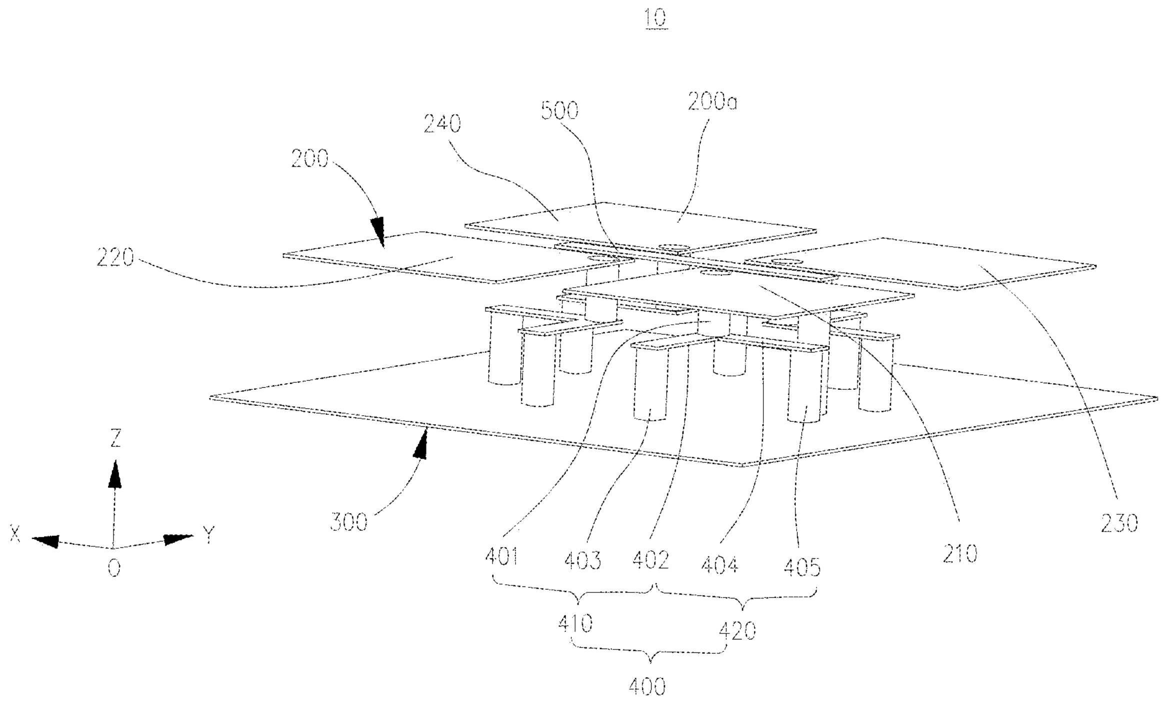
FIG. 8 is a schematic structural view illustrating an antenna module provided in other implementations of the present disclosure.

Reference can continue to be made to FIG. 8, and the patch array 200 includes a first radiator 210 and a second radiator 220. The feed ground portion 400 includes a first feed ground member 410 and a second feed ground member 420. The first part 401, the second part 402, and the third part 403 constitute the first feed ground member 410, the first part 401, the fourth part 404, and the fifth part 405 constitute the second feed ground member 420, and both the first feed ground member 410 and the second feed ground member 420 are electrically connected with one of the first radiator 210 and the second radiator 220. In this implementation, an example that both the first feed ground member 410 and the second feed ground member 420 are electrically connected with the first radiator 210 is taken for illustration.

Each of the first radiator 210 and the second radiator 220 is a metal patch, and the first radiator 210 and the second radiator 220 are disposed in mirror symmetry. In this case, when the current signal on the feeding portion 500 is coupled to the first radiator 210 and the second radiator 220, flow directions of the current in the first radiator 210 and the second radiator 220 can be relatively uniform, and radiation performance of the antenna module 10 can be relatively stable. The patch unit 200*a* may be in a rectangle, a circle, a triangle, a pentagon, a hexagon, etc.

The first feed ground member 410 is electrically connected between the first radiator 210 and the feed ground layer 300, the second feed ground member 420 is electrically connected between the first radiator 210 and the feed ground layer 300, each of the first feed ground member 410 and the second feed ground member 420 has a bending structure, and the first feed ground member 410 and the second feed ground member 420 share the first part 401. The first feed ground member 410 and the second feed ground member 420 are configured to extend the transmission path of the current, which can reduce the thickness of the antenna module 10 while improving the bandwidth of the RF signal received and emitted by the antenna module 10.

The patch array 200 further includes a third radiator 230 and a fourth radiator 240, the feed ground portion 400 includes a third feed ground member and a fourth feed ground member, both the third feed ground member and the fourth feed ground member are electrically connected with one of the third radiator 230 and the fourth radiator 240, and each of the third feed ground member and the fourth feed ground member has a bending structure.

Specifically, each of the third radiator 230 and the fourth radiator 240 is the metal patch, and the third radiator 230 and the fourth radiator 240 are disposed in mirror symmetry. The first radiator 210, the second radiator 220, the third radiator 230, and the fourth radiator 240 constitute a mesh structure. The feeding portion 500 is disposed corresponding to gaps between the first radiator 210, the second radiator 220, the third radiator 230, and the fourth radiator 240. The feeding portion 500 transmits the current to the first radiator 210, the second radiator 220, the third radiator 230, and the fourth radiator 240 in a coupled feeding manner, which makes the first radiator 210, the second radiator 220, the third radiator 230, and the fourth radiator 240 generate resonance. In this case, when the current signal on the feeding portion 500 is coupled to the first radiator 210, the second radiator 220, the third radiator 230, and the fourth radiator 240, flow directions of the current in the first radiator 210, the second radiator 220, the third radiator 230, and the fourth radiator 240 can be relatively uniform, and in turn the radiation performance of the antenna module 10 can be relatively stable.

Figure 9:
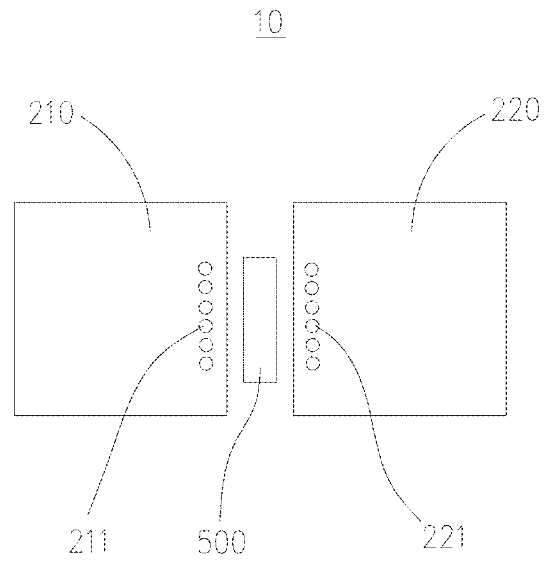
FIG. 9 is a schematic structural view illustrating radiators of an antenna module provided in implementations of the present disclosure.

Reference can continue to be made to FIG. 9, in another implementation, the first radiator 210 defines multiple first metallization via holes 211 arranged in an array at an edge part of the first radiator 210 close to the feeding portion 500, and the second radiator 220 defines multiple second metallization via holes 221 arranged in an array at an edge part of the second radiator 220 close to the feeding portion 500.

Distances between any two adjacent first metallization via holes 211 keep consistent with each other, and distance between any two adjacent second metallization via holes 221 keep consistent with each other. The first metallization via holes 211 and the second metallization via holes 221 are used to isolate the first radiator 210 and the second radiator 220, so as to prevent mutual interference between the first radiator 210 and the second radiator 220.

In an implementation, the feed ground portion 400 includes multiple feed ground members. The feed ground member is in one-to-one correspondence with the first metallization via hole 211 and the second metallization via hole 221, the feed ground member is electrically connected with the first metallization via hole 211 to electrically connect the first radiator 210 and the feed ground layer 300, and the feed ground member is electrically connected with the second metallization via hole 221 to electrically connect the second radiator 220 and the feed ground layer 300. The multiple feed ground members generate synchronous resonance, so as to generate the RF signal of the second frequency band.

Figure 10:
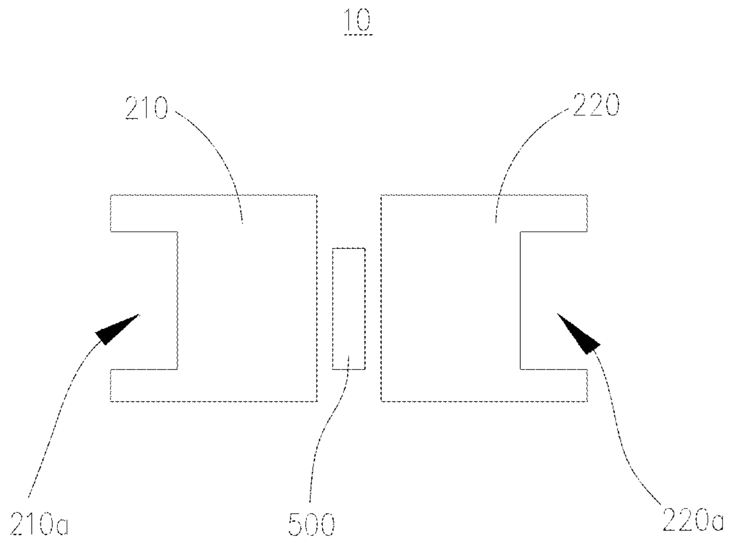
FIG. 10 is a schematic structural view illustrating radiators of an antenna module provided in other implementations of the present disclosure.

Reference can continue to be made to FIG. 10, the first radiator 210 defines a first accommodating groove 210*a* at an edge part of the first radiator 210 away from the feeding portion 500, the second radiator 220 defines a second accommodating groove 220*a* at an edge part of the second radiator 220 away from the feeding portion 500, and an opening direction of the first accommodating groove 210*a* is opposite to an opening direction of the second accommodating groove 220*a*.

The first accommodating groove 210*a* may be a rectangular groove or a curved groove. The second accommodating groove 220*a* may be a rectangular groove or a curved groove. A size of the first accommodating groove 210*a* keeps consistent with a size of the second accommodating groove 220*a*, such that when the current signal on the feeding portion 500 is coupled to the first radiator 210 and the second radiator 220, distribution of coupled current signal on the first radiator 210 and the second radiator 220 can be relatively uniform, thereby helping to improve the radiation performance of the antenna module 10.

Figure 11:
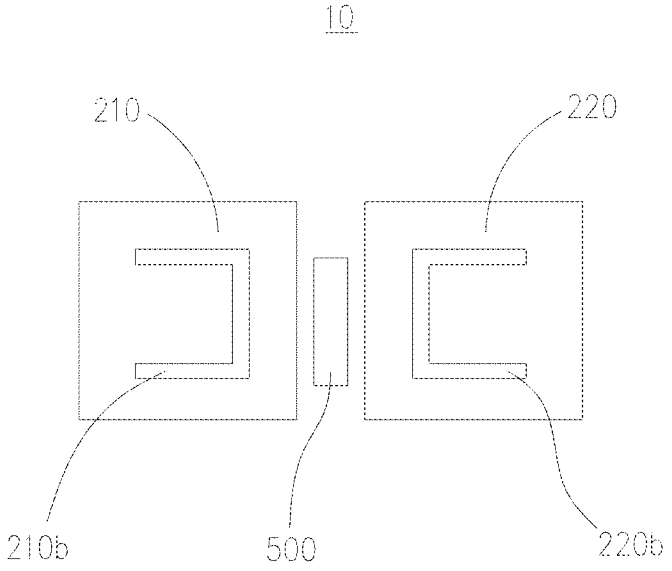
FIG. 11 is a schematic structural view illustrating radiators of an antenna module provided in other implementations of the present disclosure.

Reference can continue to be made to FIG. 11, the first radiator 210 defines a first curved groove 210*b* at a middle part of the first radiator 210 away from the feeding portion 500, and the second radiator 220 defines a second curved groove 220*b* at a middle part of the second radiator 220 away from the feeding portion 500, and an opening direction of the first curved groove 210*b* is opposite to an opening direction of the second curved groove 220*b*.

A curved groove may be a C-shaped groove, a U-shaped groove, or a broken-line shaped groove, etc. The first curved groove 210*b* is located at the middle part of the first radiator 210, the second curved groove 220*b* is located at the middle part of the second radiator 220, and the opening direction of the first curved groove 210*b* is opposite to the opening direction of the second curved groove 220*b*. Since the first curved groove 210*b* is located at the middle part of the first radiator 210 and the second curved groove 220*b* is located at the middle part of the second radiator 220, the current signal coupled to the first radiator 210 and the second radiator 220 by the feeding portion 500 is transmitted in a ring shape, which helps to extend the transmission path of the current, thereby broadening the bandwidth of the RF signal received and emitted by the antenna module 10. The first radiator 210 and the second radiator 220 are disposed in mirror symmetry, which can ensure that performance of the first radiator 210 keeps consistent with performance of the second radiator 220, so as to make the radiation performance of the antenna module 10 relatively stable.

Figure 12:
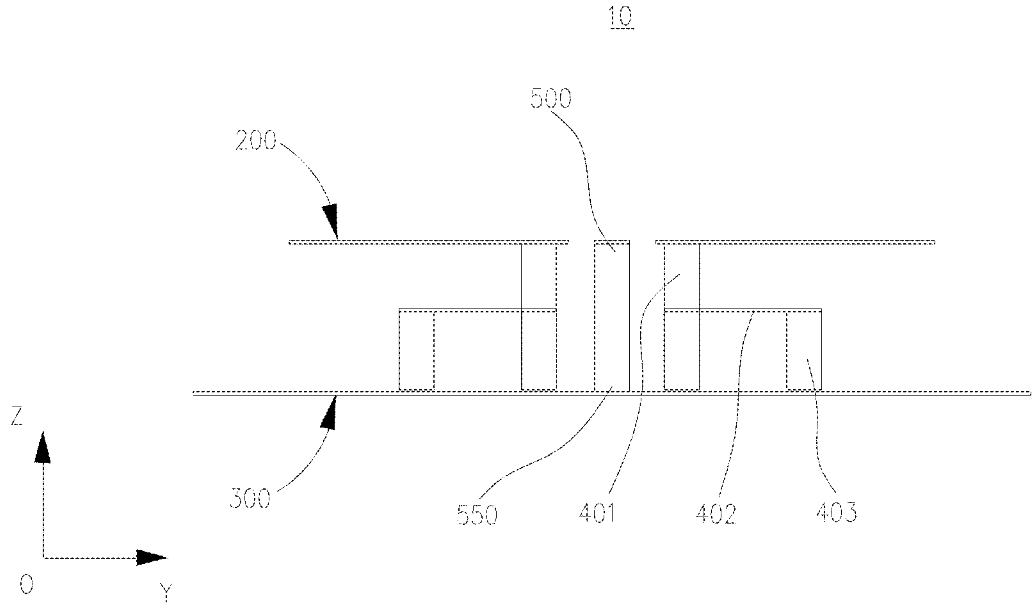
FIG. 12 is a schematic structural view illustrating an antenna module provided in implementations of the present disclosure, taken on YZ plane.
Figure 13:
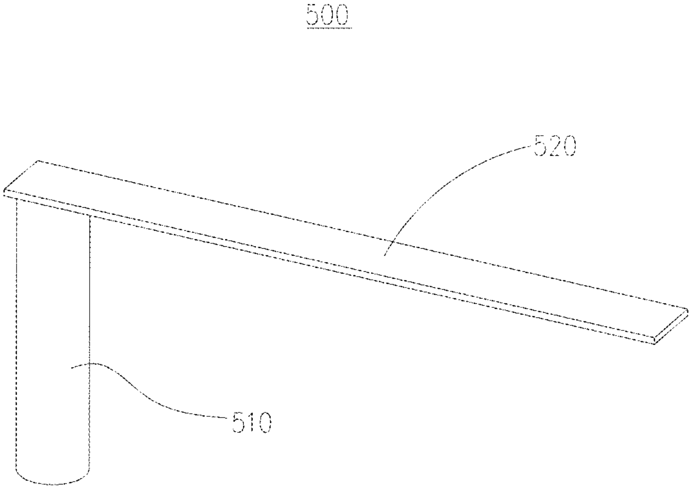
FIG. 13 is a schematic structural view illustrating a feeding portion of the antenna module provided in FIG. 12.

Reference can be made to FIG. 12 and FIG. 13 together, the antenna module 10 includes a feeding port 550, the feeding portion 500 has a first section 510 and a second section 520 bendably connected with the first section 510, the first section 510 is electrically connected with the feeding port 550, the first section 510 is disposed close to the feed ground portion 400, and the second section 520 is disposed close to the patch array 200.

Specifically, the antenna module 10 further includes a RF chip. The RF chip includes the feeding port 550. The feeding portion 500 is L-shaped and has the first section 510 and the second section 520 bendably connected with the first section 510. The first section 510 is electrically connected the feeding port 550, and the first section 510 is disposed close to the feed ground portion 400, which facilitates a current signal on the first section 510 being coupled to the feed ground portion 400. The second section 520 is disposed close to the patch array 200, which facilitates a current signal on the second section 520 being coupled to the patch array 200.

In an implementation, the second section 520 and the patch array 200 are disposed side by side, and the second section 520 and the patch array 200 keep flush with each other.

Specifically, the second section 520 is spaced apart from the patch array 200, when the second section 520 and the patch array 200 keep flush with each other, the current signal on the second section 520 can be relatively conveniently coupled to the patch array 200, such that the patch array 200 can resonate in the first frequency band, thereby generating the RF signal of the first frequency band.

Furthermore, the first section 510 is spaced apart from the feed ground portion 400, and the first section 510 is disposed close to the feed ground portion 400, such that the current signal on the first section 510 can be relatively conveniently coupled to the feed ground portion 400 to make the feed ground portion 400 resonate in the second frequency band. In an implementation, the first section 510 keeps perpendicular to the second section 520, such that the first section 510 and the second section 520 are relatively stably carried on the dielectric substrate 100, which helps to improve the yield rate of preparation of the antenna module 10.

Figure 14:
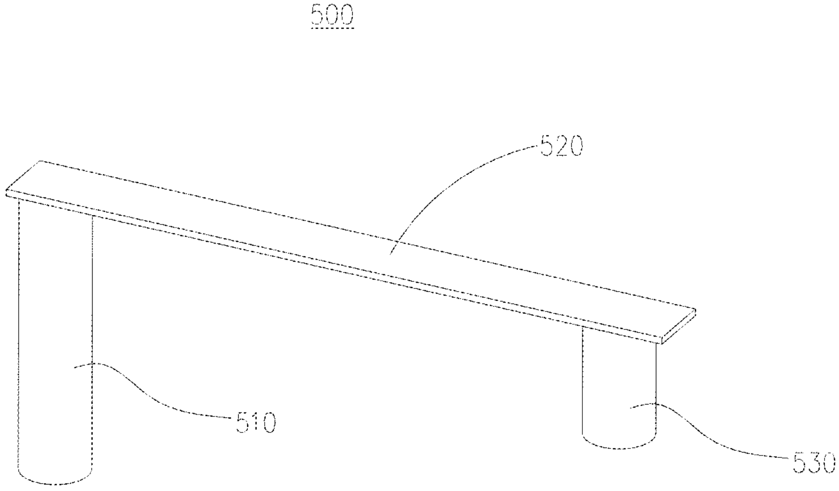
FIG. 14 is another schematic structural view illustrating a feeding portion of the antenna module provided in FIG. 12.

Reference can be made to FIG. 12 and FIG. 14 together, and the antenna module 10 includes a feeding port 550. The feeding portion 500 has a first section 510, a second section 520, and a third section 530 which are bendably connected, the second section 520 is connected between the first section 510 and the third section 530, and the first section 510 is electrically connected with the feeding port 550. The first section 510 is disposed closed to the feed ground portion 400, and the second section 520 is disposed closed to the patch array 200. An extension direction of the third section 530 keeps consistent with an extension direction of the first section 510. The third section 530 is configured to perform spatial impedance matching on a RF signal received and emitted by the patch array 200.

Furthermore, a distance between the third section 530 and the feed ground layer 300 ranges from λ/8~λ/4, where λ is a wavelength corresponding to an intermediate value of a center frequency of the first frequency band and a center frequency of the second frequency band. When the distance between the third section 530 and the feed ground layer 300 is within λ/8~λ/4, the length of the third section 530 ranges from λ/8~λ/4, in this case, the frequency of the RF signal received and emitted by the patch array 200 can be adjusted, so as to make the antenna module 10 have higher radiation efficiency.

Figure 15:
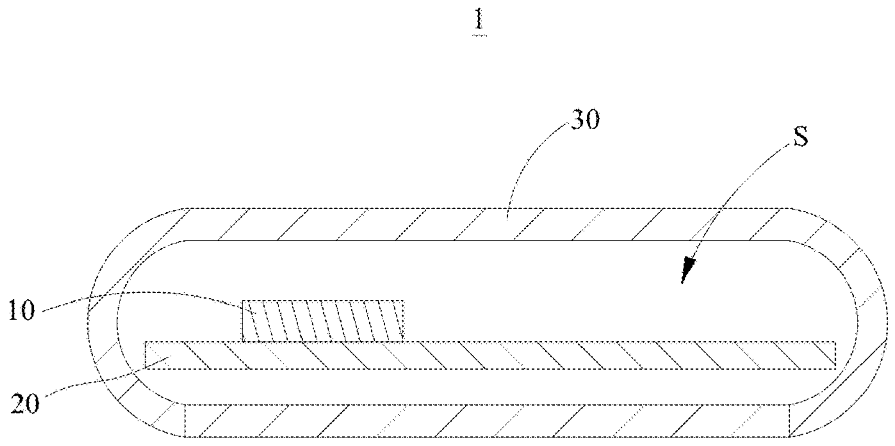
FIG. 15 is a schematic cross-sectional structural view illustrating an electronic device provided in implementations of the present disclosure.

Reference can continue to be made to FIG. 15, and an electronic device 1 is also provided in implementations of the present disclosure. The electronic device 1 includes a main board 20 and the antenna module 10 which is provided in any of the above implementations. The antenna module 10 is electrically connected with the main board 20, and the antenna module 10 is configured to receive and emit the RF signal of the first frequency band and the second frequency band under control of the main board 20.

The electronic device 1 may be any device with a communication function, for example, a tablet computer, a mobile phone, an e-reader, a remote control, a personal computer (PC), a laptop, an in-vehicle device, a network TV, a wearable device, and other smart devices with the communication function.

The main board 20 may be a printed circuit board (PCB) of the electronic device 1. The main board 20 is electrically connected with the antenna module 10 and is provided with an excitation source. The excitation source is configured to generate an excitation signal, and the excitation signal is used to control the antenna module 10 to receive and emit the RF signal of the first frequency band and the second frequency band.

The electronic device 1 provided in implementations of the present disclosure includes the antenna module 10 and the main board 20 which are electrically connected, the feed ground portion 400 electrically connected between the patch array 200 and the feed ground layer 300 is disposed as the bending structure, which can reduce the thickness of the antenna module 10 while extending the transmission path of the current. In addition, the feeding portion 500 performs coupled feeding on the antenna array and the feed ground portion 400, which can make the antenna module 10 operate in the same frequency band or different frequency bands, thereby helping to realize receiving and emitting of the RF signal of the single frequency band or the dual frequency band. When the antenna module 10 is appliable to the electronic device 1, the thickness of the electronic device 1 can be reduced.

The electronic device 1 further includes a battery cover 30. The battery cover 30 is spaced apart from the antenna module 10, and the battery cover 30 is at least partially located within a radiation direction range of receiving and emitting the RF signal by the antenna module 10. The antenna module 10 is configured to receive and emit the RF signal through the battery cover 30 under control of the main board 20, and the battery cover 30 is made of any one or more of: plastic, glass, sapphire, and ceramic.

Specifically, in a structural arrangement of the electronic device 1, the battery cover 30 is at least partially located within the radiation direction range of receiving and emitting the RF signal by the antenna module 10, therefore, the battery cover 30 can also have an impact on a radiation characteristic of the antenna module 10. Therefore, the RF signal received and emitted by the antenna module 10 can be transmitted through the battery cover 30, which can make the antenna module 10 have stable radiation performance in the structural arrangement of the electronic device 1. In other words, the battery cover 30 will not block transmission of the RF signal, and the battery cover 30 may be made of any one or any combination of: plastic, glass, sapphire, and ceramic.

Furthermore, the main board 20 is located at a side of the antenna module 10 away from the battery cover 30, and the main board 20 is configured to reflect the RF signal of the first frequency band and the second frequency band emitted by the antenna module 10 toward a side where the battery cover 30 is located.

The main board 20 is spaced apart from the battery cover 30, the battery cover 30 defines an accommodating space S, and the main board 20 is located in the accommodating space S. The antenna module 10 is electrically connected with the main board 20, the main board 20 is at least partially configured to reflect the RF signal of the first frequency band and the second frequency band emitted by the antenna module 10, such that a reflected RF signal of the first frequency band and the second frequency band is radiated to free space through the battery cover 30. The main board 20 is also configured to reflect a RF signal of the first frequency band and the second frequency band radiated from the free space through the battery cover 30 to the antenna module 10 toward a radiation surface of the antenna module 10.

Figure 16:
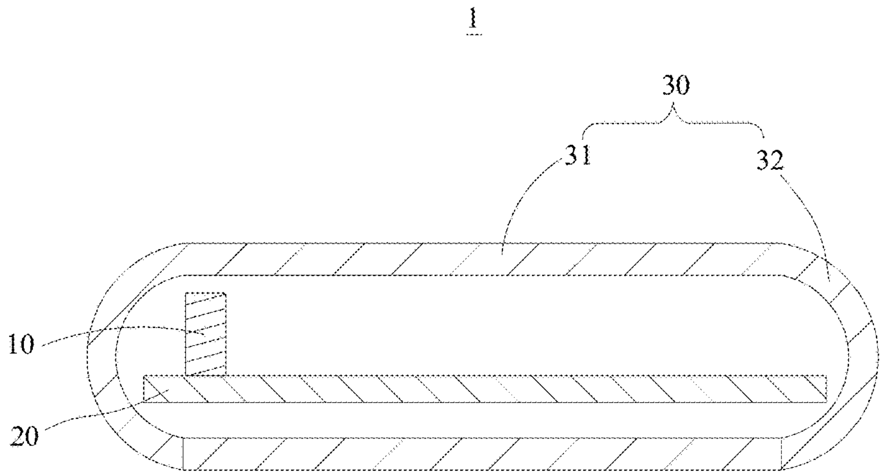
FIG. 16 is a schematic cross-sectional structural view illustrating an electronic device provided in other implementations of the present disclosure.

Reference can continue to be made to FIG. 16, the battery cover 30 includes a back plate 31 and a side plate 32 surrounding the back plate 31, and the side plate 32 is located within the radiation direction range of receiving and emitting the RF signal of the first frequency band and the second frequency band by the antenna module 10.

Specifically, when a radiation direction of the antenna module 10 faces the side plate 32 of the battery cover 30, the side plate 32 can be adopted to perform the spatial impedance matching on the RF signal received and emitted by the antenna module 10, in this case, the structural arrangement of the antenna module 10 in a whole device environment of the electronic device 1 is fully considered, as such, radiation effect of the antenna module 10 in the whole device environment can be ensured.

Figure 17:
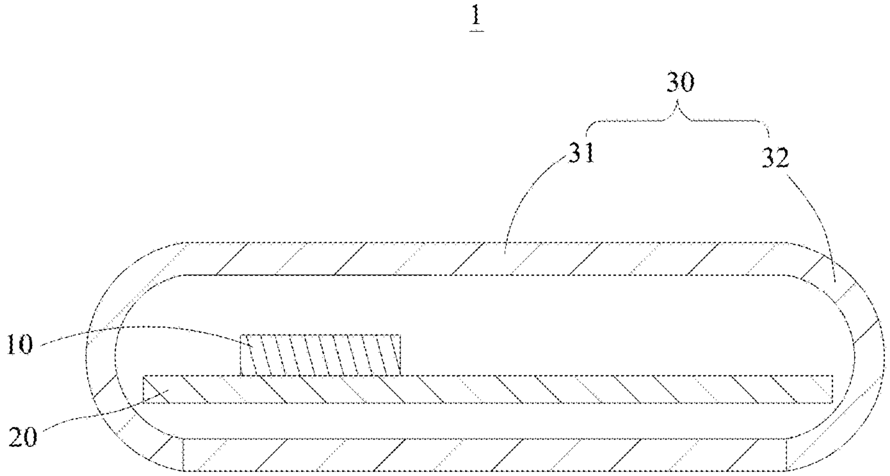
FIG. 17 is a schematic cross-sectional structural view illustrating an electronic device provided in other implementations of the present disclosure.

Reference can continue to be made to FIG. 17, the battery cover 30 includes a back plate 31 and a side plate 32 surrounding the back plate 31, and the back plate 31 is located within the radiation direction range of receiving and emitting the RF signal of the first frequency band and the second frequency band by the antenna module 10.

Specifically, when the antenna module 10 faces the back plate 31 of the battery cover 30, the back plate 31 can be adopted to perform the spatial impedance matching on the RF signal received and emitted by the antenna module 10, in this case, the structural arrangement of the antenna module 10 in the whole device environment of the electronic device 1 is fully considered, as such, the radiation effect of the antenna module 10 in the whole device environment can be ensured.

Figure 18:
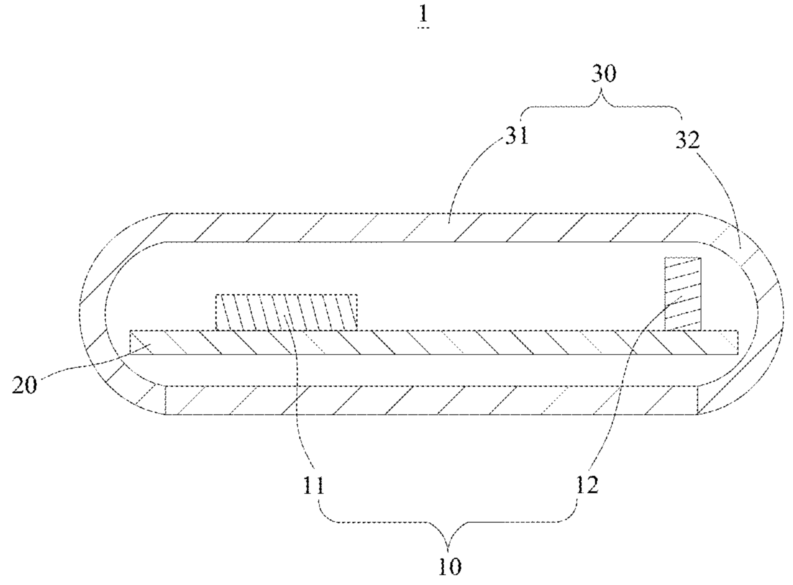
FIG. 18 is a schematic cross-sectional structural view illustrating an electronic device provided in other implementations of the present disclosure.

Reference can continue to be made to FIG. 18, the battery cover 30 includes a back plate 31 and a side plate 32 surrounding the back plate 31, the antenna module 10 includes a first module 11 and a second module 12, the first module 11 has a radiation surface facing the back plate 31, and the second module 12 has a radiation surface facing the side plate 32.

Specifically, in this implementation, the first module 11 and the second module 12 have different radiation directions. The first module 11 has the radiation surface facing the back plate 31, and the second module 12 has the radiation surface facing the side plate 32, such that directions of receiving and emitting RF signal by the antenna module 10 can be diversified. When one direction of receiving and emitting the RF signal by the antenna module 10 is blocked, another direction can be adopted to receive and emit the RF signal, such that the antenna module 10 can receive and emit the RF signal relatively stably.

Figure 19:
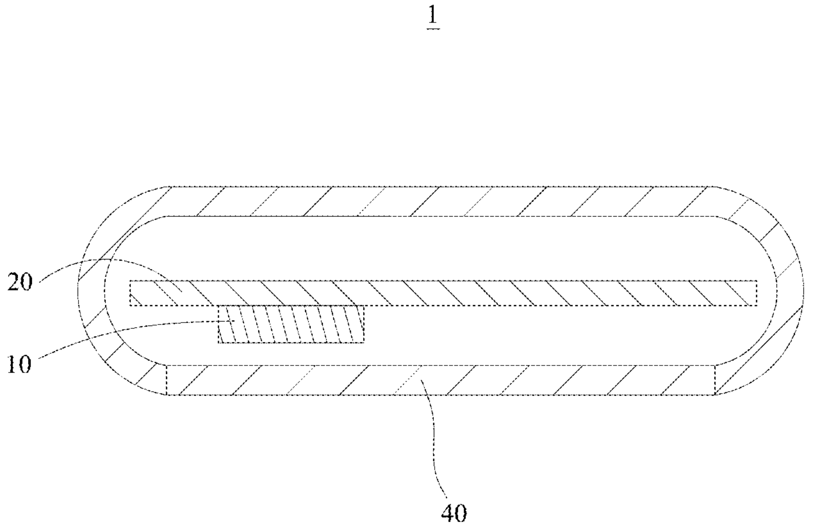
FIG. 19 is a schematic cross-sectional structural view illustrating an electronic device provided in other implementations of the present disclosure.

Reference can continue to be made to FIG. 19, and the electronic device 1 further includes a screen 40. The screen 40 is spaced apart from the antenna module 10, and the screen 40 is at least partially located within the radiation direction range of receiving and emitting the RF signal of the first frequency band and the second frequency band by the antenna module 10.

Specifically, when the antenna module 10 faces the screen 40, the screen 40 can be adopted to perform the spatial impedance matching on the RF signal received and emitted by the antenna module 10, in this case, the structural arrangement of the antenna module 10 in the whole device environment of the electronic device 1 is fully considered, as such, the radiation effect of the antenna module 10 in the whole device environment can be ensured.

Figure 20:
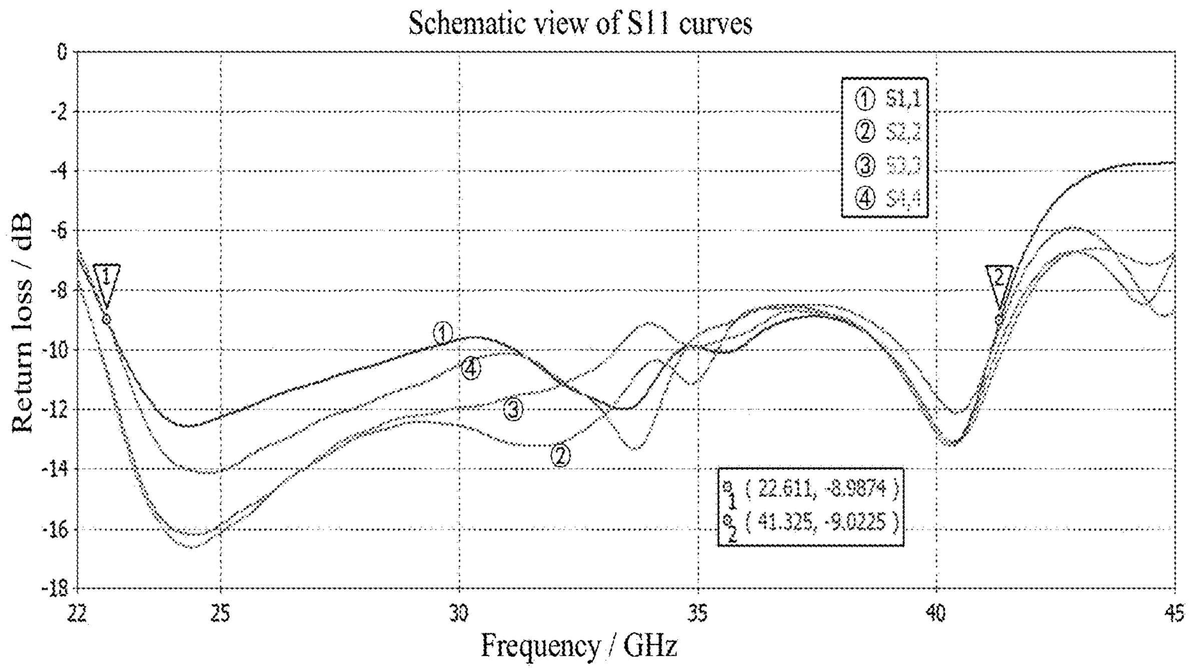
FIG. 20 is a schematic structural view illustrating a return loss curve of each port of a 1×4 antenna array.

Reference can continue to be made to FIG. 20, which is a schematic view illustrating a return loss curve of each port of a 1×4 antenna array. The abscissa represents the frequency in units of GHz, and the ordinate represents the return loss in units of decibel (dB). In the present disclosure, the 1×4 antenna array has the size of 20 mm×4.2 mm×0.85 mm, and the antenna array has the thickness of 0.85 mm. In FIG. 20, four ports of the 1×4 antenna array are marked as S1,1, S2,2, S3,3, and S4,4 respectively, and corresponding return loss curves are ①, ②, ③, and ④ in sequence. It can be seen that since the 1×4 antenna array is disposed in mirror symmetry, a return loss curve ① corresponding to port S1,1 of the antenna array basically coincides with a return loss curve ④ corresponding to port S4,4 of the antenna array, and a return loss curve ② corresponding to port S2,2 of the antenna array basically coincides with a return loss curve ③ corresponding to port S3,3 of the antenna array. At mark point 1, a frequency is 22.611 GHz, and a corresponding return loss is −8.9874 dB. At mark point 2, the frequency is 41.325 GHz, and the corresponding return loss is −9.0225 dB. In other words, the 1×4 antenna array can cover the full frequency band of n257, n258, n261, and n260 mmWave. When $S11 \leq -10$ dB, a frequency band ranges from 22.611 GHz~41.325 GHz, and the 1×4 antenna array has an impedance bandwidth of 18.714 GHz. In addition, it can be seen that two ports S2,2 and S3,3 located in a middle position correspond to relatively small return losses.

Figure 21:
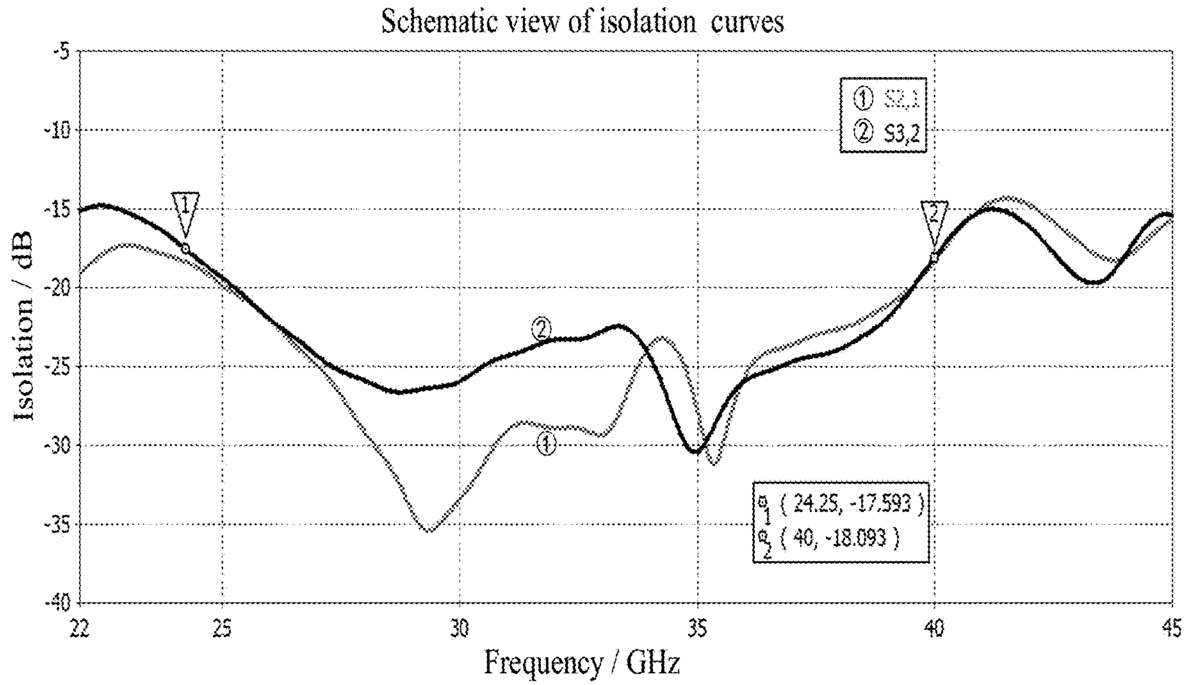
FIG. 21 is a schematic view illustrating isolation curves between patch-unit ports of a 1×4 antenna array.

Reference can continue to be made to FIG. 21, which is a schematic view illustrating isolation curves between patch-unit ports of a 1×4 antenna array. The abscissa represents the frequency in units of GHz, and the ordinate represents the isolation in units of dB. In FIG. 21, patch-unit ports in the same antenna module are marked as S2,1 and S3,2. At mark point 1, the frequency is 24.25 GHz, and the corresponding isolation is −17.593 dB. At mark point 2, the frequency is 40 GHz, and the corresponding isolation is −18.093 dB. In other words, the 1×4 antenna array can cover the full frequency band of n257, n258, n261, and n260 mmWave. In addition, isolation between the patch-unit ports is relatively large, which can avoid mutual interference between adjacent patch units.

Figure 22:
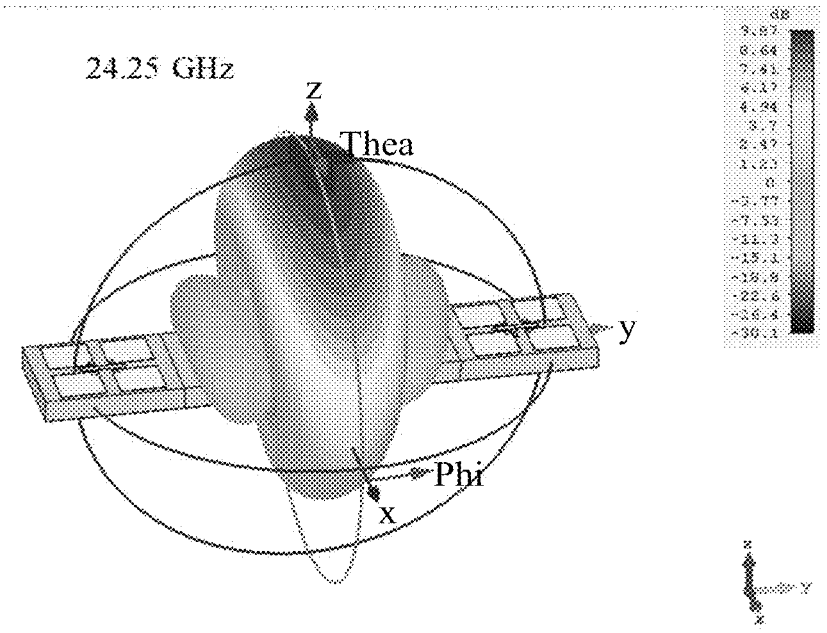
FIG. 22 is a radiation gain pattern illustrating an antenna module in a frequency band of 24.25 gigahertz (GHz).

Reference can continue to be made to FIG. 22, which is a radiation gain pattern illustrating an antenna module in a frequency band of 24.25 GHz. Z axis represents a radiation direction of an antenna module, and XY axis represents a radiation angle of the antenna module relative to a main lobe. It can be seen that at a resonant frequency point of 24.25 GHz, a gain is greatest, a directivity is greatly improved, and a peak gain reaches 9.87 dB.

Figure 23:
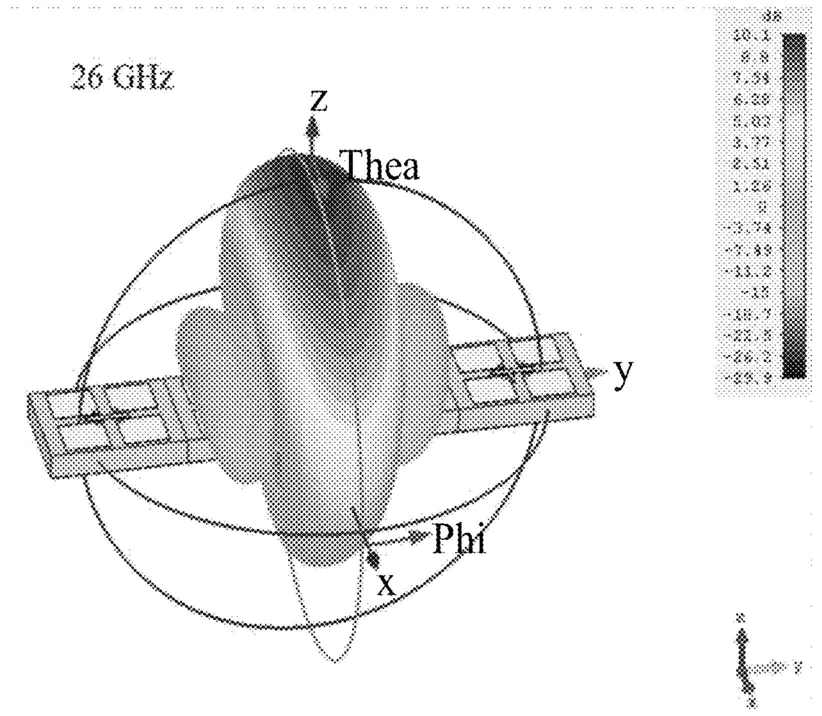
FIG. 23 is a radiation gain pattern illustrating an antenna module in a frequency band of 26 GHz.

Reference can continue to be made to FIG. 23, which is a radiation gain pattern illustrating an antenna module in a frequency band of 26 GHz. Z axis represents the radiation direction of the antenna module, and XY axis represents the radiation angle of the antenna module relative to the main lobe. It can be seen that at the resonant frequency point of 26 GHz, the gain is greatest, the directivity is greatly improved, and the peak gain reaches 10.1 dB.

Figure 24:
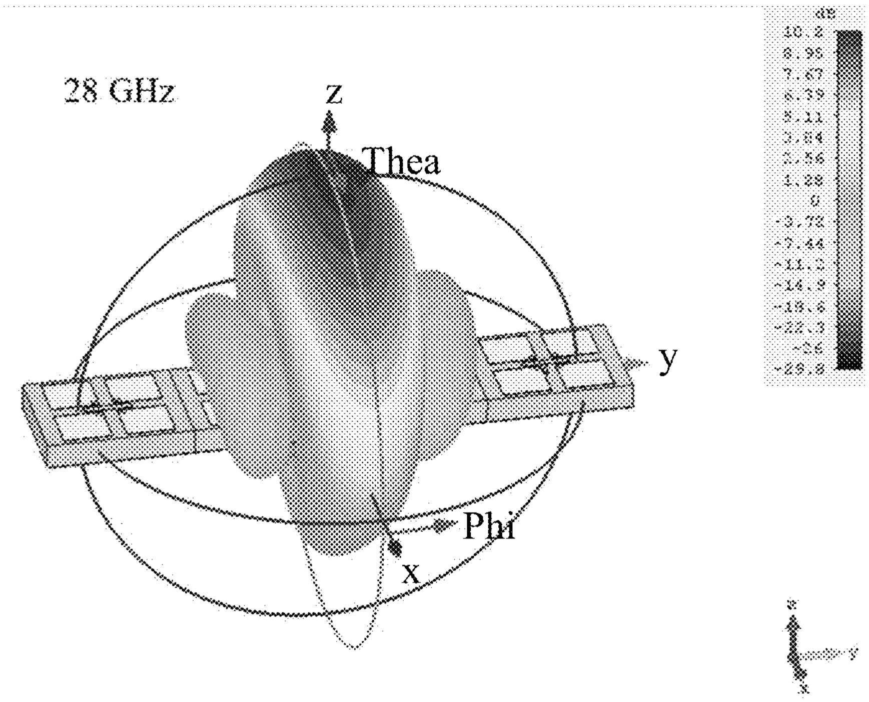
FIG. 24 is a radiation gain pattern illustrating an antenna module in a frequency band of 28 GHz.

Reference can continue to be made to FIG. 24, which is a radiation gain pattern illustrating an antenna module in a frequency band of 28 GHz. Z axis represents the radiation direction of the antenna module, and XY axis represents the radiation angle of the antenna module relative to the main lobe. It can be seen that at the resonant frequency point of 28 GHz, the gain is greatest, the directivity is greatly improved, and the peak gain reaches 10.2 dB.

Figure 25:
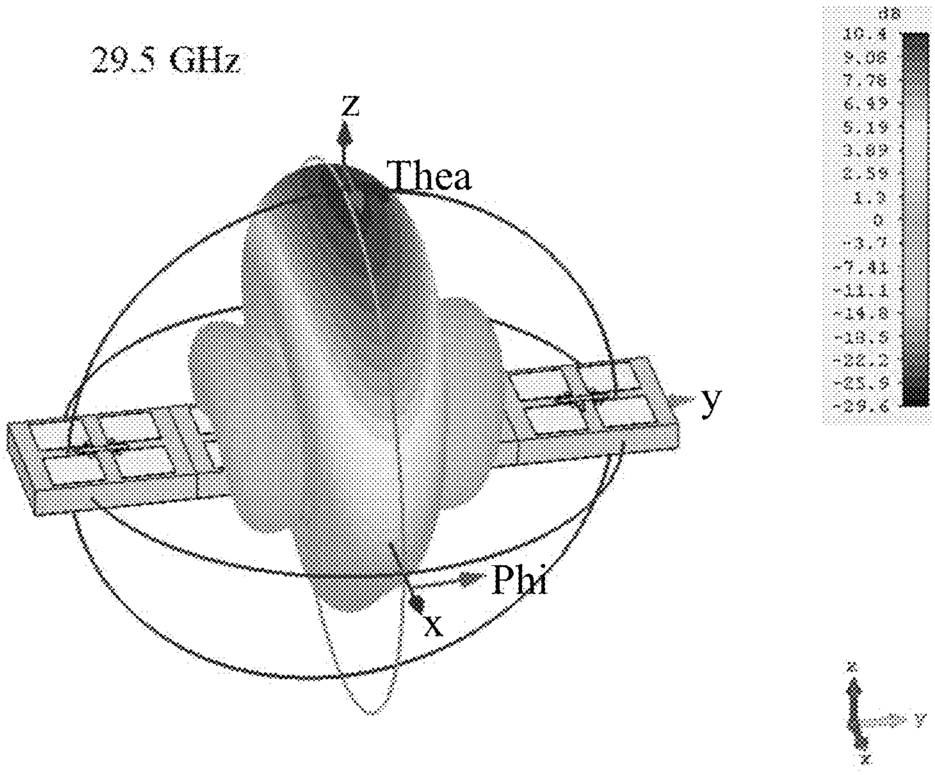
FIG. 25 is a radiation gain pattern illustrating an antenna module in a frequency band of 29.5 GHz.

Reference can continue to be made to FIG. 25, which is a radiation gain pattern illustrating an antenna module in a frequency band of 29.5 GHz. Z axis represents the radiation direction of the antenna module, and XY axis represents the radiation angle of the antenna module relative to the main lobe. It can be seen that at the resonant frequency point of 29.5 GHz, the gain is greatest, the directivity is greatly improved, and the peak gain reaches 10.4 dB.

Figure 26:
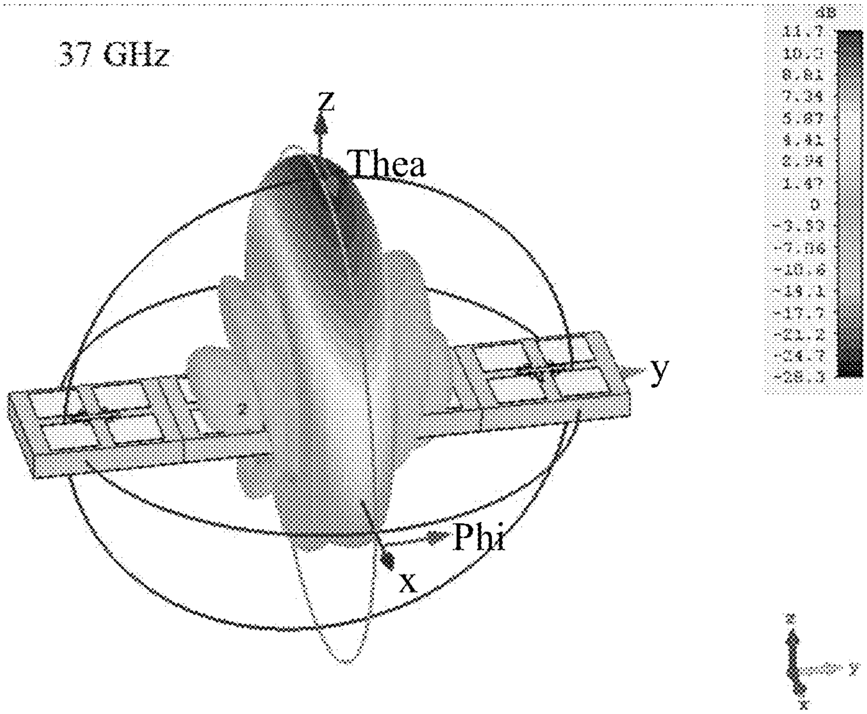
FIG. 26 is a radiation gain pattern illustrating an antenna module in a frequency band of 37 GHz.

Reference can continue to be made to FIG. 26, which is a radiation gain pattern illustrating an antenna module in a frequency band of 37 GHz. Z axis represents the radiation direction of the antenna module, and XY axis represents the radiation angle of the antenna module relative to the main lobe. It can be seen that at the resonant frequency point of 37 GHz, the gain is greatest, the directivity is greatly improved, and the peak gain reaches 11.7 dB.

Figure 27:
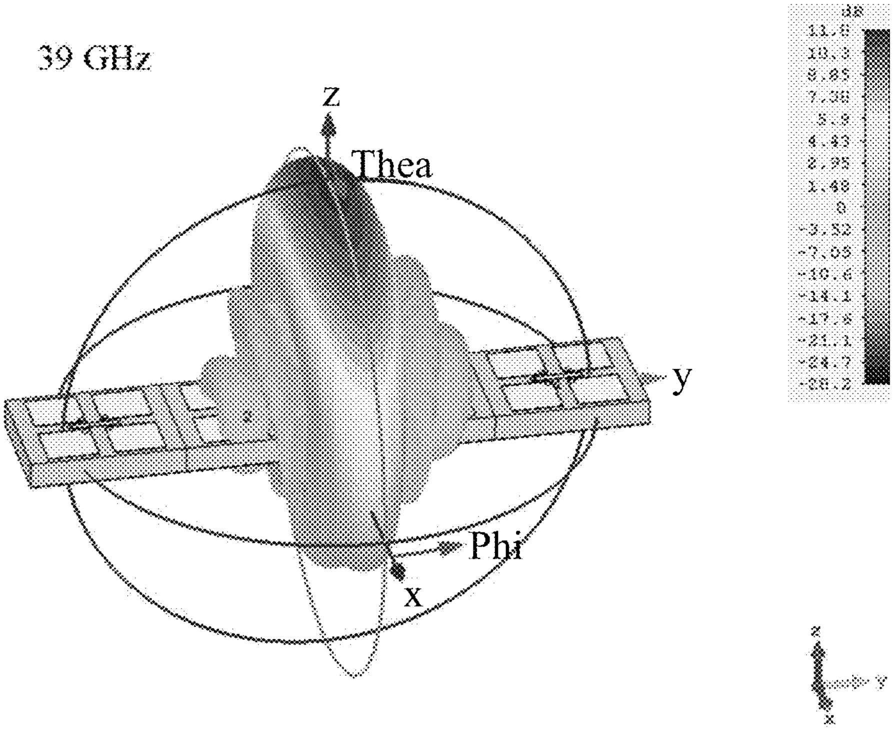
FIG. 27 is a radiation gain pattern illustrating an antenna module in a frequency band of 39 GHz.

Reference can continue to be made to FIG. 27, which is a radiation gain pattern illustrating an antenna module in a frequency band of 39 GHz. Z axis represents the radiation direction of the antenna module, and XY axis represents the radiation angle of the antenna module relative to the main lobe. It can be seen that at the resonant frequency point of 39 GHz, the gain is greatest, the directivity is greatly improved, and the peak gain reaches 11.8 dB.

Figure 28:
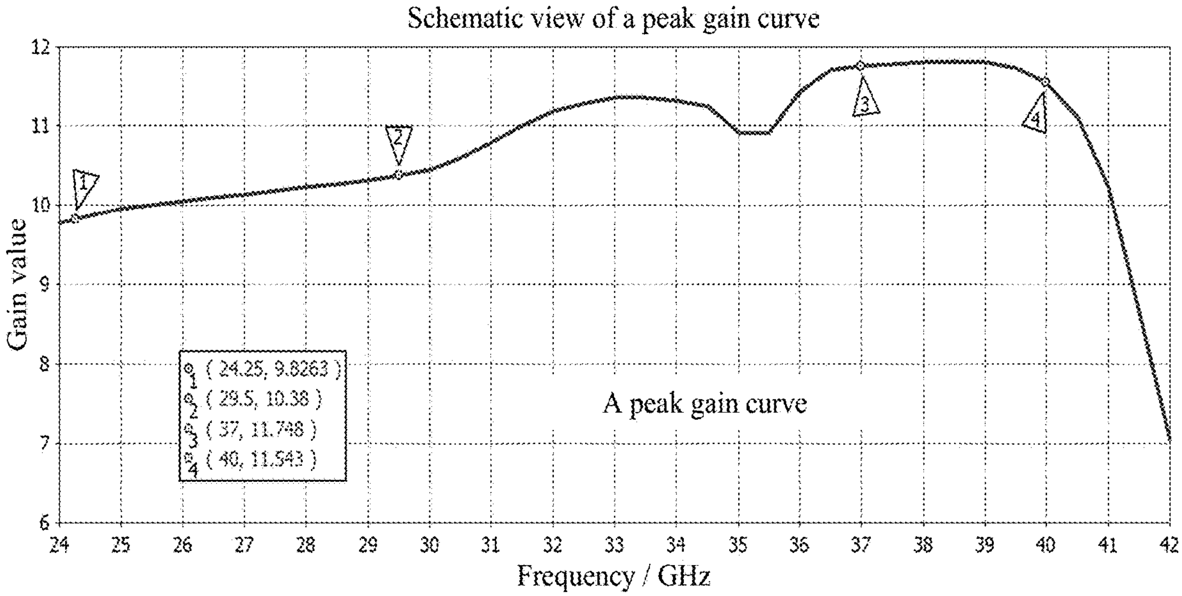
FIG. 28 is a schematic view illustrating a variation curve of a peak gain of an antenna module with a frequency.

Reference can continue to be made to FIG. 28, which is a schematic view illustrating a variation curve of a peak gain of an antenna module with a frequency. The abscissa represents the frequency in units of GHz, and the ordinate represents the peak gain. At mark point 1, a frequency is 24.25 GHz, and a corresponding peak gain is 9.8263. At mark point 2, the frequency is 29.5 GHz, and the corresponding peak gain is 10.38. At mark point 3, the frequency is 37 GHz, and the corresponding peak gain is 11.748. At mark point 4, the frequency is 40 GHz, and the corresponding peak gain is 11.543. It can be seen that the 1×4 antenna array can cover the full frequency band of n257, n258, n261, and n260 mmWave, in addition, with the frequency increasing from 24.25 GHz to 39 GHz, the peak gain of the antenna module gradually increases, and with the frequency increasing from 39 GHz to 40 GHz, the peak gain of the antenna module gradually decreases.

The above implementations in the present disclosure are described in detail. Principles and implementation manners of the present disclosure are elaborated with specific implementations herein. The above illustration of implementations is only used to help to understand methods and core ideas of the present disclosure. At the same time, for those of ordinary skill in the art, according to ideas of the present disclosure, there will be changes in specific implementation manners and application scope. In summary, contents of this specification should not be understood as limitations on the present disclosure.

What is claimed is:

1. An antenna module, comprising:

a dielectric substrate;

a patch array carried on the dielectric substrate;

a feed ground layer carrying the dielectric substrate and spaced apart from the patch array;

a feed ground portion electrically connected between the patch array and the feed ground layer, wherein the feed ground portion has a first part, a second part, a third part, a fourth part, and a fifth part, the first part, the second part, and the third part are bendably connected in sequence, the first part, the fourth part, and the fifth part are bendably connected in sequence, the first part is electrically connected with the patch array, the third part is electrically connected with the feed ground layer, and the fifth part is electrically connected with the feed ground layer; and a feeding portion configured to feed a current signal, wherein the current signal is coupled to the patch array to excite the patch array to resonate in a first frequency band, and the current signal is coupled to the feed ground portion to excite the feed ground portion to resonate in a second frequency band.

2. The antenna module of claim 1, wherein the second part keeps orthogonal to the fourth part, the third part keeps parallel to the fifth part, and the second part keeps orthogonal or parallel to the feeding portion.

3. The antenna module of claim 1, wherein the first part is perpendicular to a plane on which the patch array is located, the third part is perpendicular to a plane on which the feed ground layer is located, and the fifth part is perpendicular to the plane on which the feed ground layer is located; and a first preset included angle is defined between the first part and the second part, a second preset included angle is defined between the second part and the third part, a third preset included angle is defined between the first part and the fourth part, and a fourth preset included angle is defined between the fourth part and the fifth part, the first preset included angle ranging from 80°~100°, the second preset included angle ranging from 80°~100°, the third preset included angle ranging from 80°~100°, and the fourth preset angle ranging from 80°~100°.

4. The antenna module of claim 1, wherein each of the second part and the fourth part is a long-strip patch, a square patch, or a circular patch;

the second part has a first electrical connection end and a second electrical connection end disposed opposite to the first electrical connection end, and the fourth part has a third electrical connection end and a fourth electrical connection end disposed opposite to the third electrical connection end; and each of the first electrical connection end and the third electrical connection end is electrically connected with the first part, the second electrical connection end is electrically connected with the third part, and the fourth electrical connection end is electrically connected with the fifth part.

5. The antenna module of claim 4, wherein the second part defines a first through hole, the fourth part defines a second through hole, the first through hole avoids the first electrical connection end and the second electrical connection end, and the second through hole avoids the third electrical connection end and the fourth electrical connection end.

6. The antenna module of claim 1, wherein the patch array comprises a first radiator and a second radiator, the feed ground portion comprises a first feed ground member and a second feed ground member, the first part, the second part, and the third part constitute the first feed ground member, the first part, the fourth part, and the fifth part constitute the second feed ground member, and both the first feed ground member and the second feed ground member are electrically connected with one of the first radiator and the second radiator.

7. The antenna module of claim 6, wherein the first radiator defines a plurality of first metallization via holes arranged in an array at an edge part of the first radiator close to the feeding portion, and the second radiator defines a plurality of second metallization via holes arranged in an array at an edge part of the second radiator close to the feeding portion.

8. The antenna module of claim 6, wherein the first radiator defines a first accommodating groove at an edge part of the first radiator away from the feeding portion, the second radiator defines a second accommodating groove at an edge part of the second radiator away from the feeding portion, and an opening direction of the first accommodating groove is opposite to an opening direction of the second accommodating groove.

9. The antenna module of claim 6, the first radiator defines a first curved groove at a middle part of the first radiator away from the feeding portion, and the second radiator defines a second curved groove at a middle part of the second radiator away from the feeding portion, and an opening direction of the first curved groove is opposite to an opening direction of the second curved groove.

10. The antenna module of claim 1, wherein the patch array constitutes an electric dipole antenna, the feed ground portion constitutes a magnetic dipole antenna, and a radiation direction of the patch array keeps orthogonal to a radiation direction of the feed ground portion.

11. The antenna module of claim 10, wherein the first frequency band is different from the second frequency band, a minimum value of the first frequency band is greater than a maximum value of the second frequency band, the first frequency band and the second frequency band together constitute a preset frequency band, and the preset frequency band at least comprises a full frequency band of 3rd generation partnership project (3GPP) millimeter wave (mmWave).

12. The antenna module of claim 1, wherein a size of the feed ground layer is $\lambda \times \lambda$, and a distance between the patch array and the feed ground layer is $\lambda/4$, $\lambda$ being a wavelength corresponding to an intermediate value of a center frequency of the first frequency band and a center frequency of the second frequency band.

13. The antenna module of claim 1, further comprising:
- a feeding port, wherein the feeding portion has a first section and a second section bendably connected with the first section, the first section is electrically connected with the feeding port, the first section is disposed close to the feed ground portion, and the second section is disposed close to the patch array.

14. The antenna module of claim 1, further comprising:
- a feeding port, wherein the feeding portion has a first section, a second section, and a third section which are bendably connected, the second section is connected between the first section and the third section, the first section is electrically connected with the feeding port, the first section is disposed close to the feed ground portion, the second section is disposed close to the patch array, an extension direction of the third section keeps consistent with an extension direction of the first section, and the third section is configured to perform spatial impedance matching on a radio frequency (RF) signal received and emitted by the patch array.

15. The antenna module of claim 14, wherein a distance between the third section and the feed ground layer ranges from $\lambda/8 \sim \lambda/4$, $\lambda$ being a wavelength corresponding to an intermediate value of a center frequency of the first frequency band and a center frequency of the second frequency band.

16. The antenna module of claim 1, wherein a projection of the patch array on the dielectric substrate is located within a range of a projection of the feed ground layer on the dielectric substrate.

17. An electronic device, comprising:
- a main board; and
- an antenna module, comprising:
  - a dielectric substrate;
  - a patch array carried on the dielectric substrate;
  - a feed ground layer carrying the dielectric substrate and spaced apart from the patch array;
  - a feed ground portion electrically connected between the patch array and the feed ground layer, wherein the feed ground portion has a first part, a second part, a third part, a fourth part, and a fifth part, the first part, the second part, and the third part are bendably connected in sequence, the first part, the fourth part, and the fifth part are bendably connected in sequence, the first part is electrically connected with the patch array, the third part is electrically connected with the feed ground layer, and the fifth part is electrically connected with the feed ground layer; and
  - a feeding portion configured to feed a current signal, wherein the current signal is coupled to the patch array to excite the patch array to resonate in a first frequency band, and the current signal is coupled to the feed ground portion to excite the feed ground portion to resonate in a second frequency band;
- wherein the antenna module is electrically connected with the main board, and the antenna module is configured to receive and emit a radio frequency (RF) signal of the first frequency band and the second frequency band under control of the main board.

18. The electronic device of claim 17, further comprising:
- a battery cover, wherein the battery cover is spaced apart from the antenna module, the battery cover is at least partially located within a radiation direction range of receiving and emitting the RF signal by the antenna module, and the antenna module is configured to receive and emit the RF signal through the battery cover under control of the main board.

19. The electronic device of claim 18, wherein the main board is located at a side of the antenna module away from the battery cover, and the main board is configured to reflect the RF signal of the first frequency band and the second frequency band emitted by the antenna module toward a side where the battery cover is located.

20. The electronic device of claim 17, further comprising:

a screen, wherein the screen is spaced apart from the antenna module, and the screen is at least partially located within a radiation direction range of receiving and emitting the RF signal of the first frequency band and the second frequency band by the antenna module.

* * * * *